United States Patent
Kaneko

(10) Patent No.: US 6,417,903 B1
(45) Date of Patent: Jul. 9, 2002

(54) LIQUID CRYSTAL DISPLAY DEVICE

(75) Inventor: Yasushi Kaneko, Tokorozawa (JP)

(73) Assignee: Citizen Watch Co., Ltd., Tokyo (JP)

(*) Notice: Subject to any disclaimer, the term of this patent is extended or adjusted under 35 U.S.C. 154(b) by 10 days.

(21) Appl. No.: 09/610,439

(22) Filed: Jul. 3, 2000

Related U.S. Application Data

(62) Division of application No. 09/106,283, filed on Jun. 29, 1998.

(30) Foreign Application Priority Data

Jun. 30, 1997 (JP) .............................. 9-173833
Jul. 18, 1997 (JP) .............................. 9-194052

(51) Int. Cl.[7] .......................................... G02F 1/1335
(52) U.S. Cl. ..................... 349/117; 349/96; 349/115
(58) Field of Search ......................... 349/15, 74, 96, 349/115; 359/53

(56) References Cited

U.S. PATENT DOCUMENTS

| | | | | |
|---|---|---|---|---|
| 5,325,218 A | * | 6/1994 | Willet et al. .................. 359/53 |
| 5,381,253 A | * | 1/1995 | Sharp et al. .................. 359/53 |
| 5,486,935 A | * | 1/1996 | Kalmanash ................... 359/37 |
| 5,528,393 A | * | 6/1996 | Sharp et al. .................. 359/53 |
| 5,627,666 A | * | 5/1997 | Sharp et al. .................. 349/74 |
| 5,835,166 A | * | 11/1998 | Hall et al. ..................... 349/15 |

FOREIGN PATENT DOCUMENTS

| JP | 52-5550 | 1/1977 |
|---|---|---|
| JP | 6-230363 | 8/1994 |

OTHER PUBLICATIONS

Maurer et al., Polarizing Color Filters Made From Cholesteric LC Silicones, SID Digest 1990, pp. 110–112.*

* cited by examiner

Primary Examiner—Kenneth Parker
Assistant Examiner—David Chung
(74) Attorney, Agent, or Firm—Armstrong, Westerman & Hattori, LLP

(57) ABSTRACT

An STN liquid crystal element, formed to sandwich a nematic liquid crystal 6 twist-aligned at an angle ranging from 180 degrees to 270 degrees between a first substrate 1 having a first electrode and a second substrate 2 having a second electrode, is disclosed A polarizing film is disposed outside the second substrate of the STN liquid crystal element through a retardation film or a twisted retardation film, a cholesteric liquid crystal polymer sheet is disposed outside the first substrate through a retardation film for circularly polarized light, and a light absorbing film is disposed outside the cholesteric liquid crystal polymer sheet, to thereby form a liquid crystal display device which enables metallic color display.

11 Claims, 17 Drawing Sheets

FIG. 23

| | 1 | 2 | 3 | 4 | 5 | 6 | 7 | 8 |
|---|---|---|---|---|---|---|---|---|
| PHASE DIFFERENCE PLATE FOR CIRCULARLY POLARIZED LIGHT | LEFT-HANDED CIRCULARLY POLARIZED LIGHT | | | | | | | |
| FIRST LIQUID CRYSTAL | OFF | | | | ON | | | |
| POLARIZED LIGHT STATE | RIGHT-HANDED CIRCULARLY POLARIZED LIGHT | | | | LEFT-HANDED CIRCULARLY POLARIZED LIGHT | | | |
| FIRST POLYMER | TRANSMITTED | | | | BLUE | | | |
| SECOND LIQUID CRYSTAL | OFF | | ON | | OFF | | ON | |
| POLARIZED LIGHT STATE | LEFT | | RIGHT | | LEFT | | RIGHT | |
| SECOND POLYMER | GREEN | | TRANSMITTED | | TRANSMITTED | | GREEN | |
| THIRD LIQUID CRYSTAL | OFF | ON | OFF | ON | OFF | ON | OFF | ON |
| POLARIZED LIGHT STATE | RIGHT | LEFT | LEFT | RIGHT | LEFT | RIGHT | RIGHT | LEFT |
| THIRD POLYMER | TRANSMITTED | RED | RED | TRANSMITTED | RED | TRANSMITTED | TRANSMITTED | RED |
| DISPLAYED COLOR | GREEN | YELLOW | RED | BLACK | VIOLET | BLUE | SKY BLUE | WHITE |

LIQUID CRYSTAL DISPLAY DEVICE

This application is a division of prior application Ser. No. 09/106,283 filed Jun. 29, 1998.

BACKGROUND OF THE INVENTION

1. Field of the Invention

The present invention relates to a liquid crystal display device, and more particularly, to a color liquid crystal display device for coloring a background or display regions in a single color or a plurality of colors.

2. Description of the Related Art

Conventionally, several schemes have been proposed for a single-color liquid crystal display device for coloring a background or display regions of the liquid crystal display device.

A first conventional example is a single-color liquid crystal display device having a color polarizing film disposed outside a liquid crystal display element The device has a simple structure and is generally used in many applications.

A second conventional example is a single-color liquid crystal display device in which a dichroic dye is mixed in a nematic liquid crystal of a liquid crystal element to cause the dichroic dye to function with the operation of nematic liquid crystal molecules, which is called a guest-host scheme.

However, such conventional single-color liquid crystal display devices display characters or figures colored with a dye or a dichroic dye on a white background, or conversely, display white characters or figures on a background colored with a dye or a dichroic dye, resulting in a low contrast.

The above-described liquid crystal display devices also have a disadvantage of limited number of colors to be displayed due to a limited number of dyes or dichroic dyes available.

Thus, as a third conventional example, a single-color liquid crystal display device composed of a single polarizing film, a TN liquid crystal element having a twist angle of 90 degrees, a retardation film for circularly polarized light, a cholesteric liquid crystal film, and a light absorbing film has been proposed. The single-color liquid crystal display device displays brightly colored characters or figures on a black background utilizing a selective scattering phenomenon, or conversely, displays black characters or figures on a brightly colored background, thus obtaining display with a higher contrast.

Also, the single-color liquid crystal display device can display optional colors only by adjusting a twist pitch in the cholesteric liquid crystal film to thereby realize a display device for colorful single-color display.

Incidentally, such conventional arts are disclosed, for example, in Japanese Laid-open Patent Application No. 52-5550 and Japanese Laid-open Patent Application No. 6-230362.

However, the above-mentioned single-color liquid crystal display device using a cholesteric liquid crystal film has disadvantages in that the viewing angle characteristic is poor due to the use of a TN liquid crystal element and it is difficult to apply the device to a high density liquid crystal display device having 100 or more scanning lines.

Additionally, the above-mentioned device provides only single-color display since only one cholesteric liquid crystal film is used.

The device also has a disadvantage in that backlight illumination can not be utilized due to the use of a light absorbing film which does not transmit light, thereby reducing nighttime or low ambient light visibility.

SUMMARY OF THE INVENTION

The present invention is made to solve the above-mentioned disadvantages and a first object of the present invention is to provide a liquid crystal display device which has a good viewing angle characteristic and can perform single-color display with a colorful tone and a higher contrast even in a high-density liquid crystal display device having 100 or more scan lines.

A second object of the present invention is to provide a liquid crystal display device which can perform multi-color display in two or more colors and with a colorful tone and a higher contrast.

A third object of the present invention is to provide a liquid crystal display device which realizes sufficient brightness even at night using backlight illumination.

To achieve the above-mentioned first object, the present invention provides a liquid crystal display device composed of: an STN liquid crystal element arranged to sandwich a nematic liquid crystal twist-aligned at an angle ranging from 180 degrees to 270 degrees between a first substrate having a first electrode and a second substrate having a second electrode; a retardation film provided outside the second substrate; a polarizing film provided outside the retardation film; a retardation film for circularly polarized light provided outside the first substrate; a cholesteric liquid crystal polymer sheet provided outside the retardation film for circularly polarized light; and a light absorbing film provided outside the cholesteric liquid crystal polymer sheet.

A twisted retardation film can be used as the retardation film.

Also, the liquid crystal display device can be composed of: a TN liquid crystal element arranged to sandwich a nematic liquid crystal twist-aligned at an angle of approximately 90 degrees between a first substrate having a first electrode and a second substrate having a second electrode; a polarizing film provided outside the second substrate; a retardation film for circularly polarized light provided outside the first substrate; first cholesteric liquid crystal polymer sheets provided outside the retardation film for circularly polarized light; a second cholesteric liquid crystal polymer sheet provided outside the first cholesteric liquid crystal polymer sheet; and a light absorbing film provided outside the second cholesteric liquid crystal polymer sheet, wherein the first cholesteric liquid crystal polymer sheet and the second cholesteric liquid crystal polymer sheet have different scattering center wavelengths and have respective twist directions in the same direction.

To achieve the above-mentioned second object, the present invention provides the above-mentioned liquid crystal display device in which the cholesteric liquid crystal polymer sheet includes a plurality of cholesteric liquid crystal polymer sheets provided outside the retardation film for circularly polarized light, the light absorbing film is provided outside the outermost cholesteric liquid crystal polymer sheet within the plurality of cholesteric liquid crystal polymer sheets, and the plurality of cholesteric liquid crystal polymer sheets have scattering center wavelengths different from one another and have respective twist directions in the opposite directions.

Also, as the above-mentioned plurality of cholesteric liquid crystal polymer sheets, a first cholesteric liquid crystal polymer sheet and a second cholesteric liquid crystal polymer sheet having twist directions in the same direction can be provided and a half-wavelength retardation film can be provided between the first and second cholesteric liquid crystal polymer sheets.

A liquid crystal display device according to the present invention can be composed of: a TN liquid crystal element, a polarizing film provided outside a second substrate thereof; a reflection-type polarizing film provided outside a first substrate thereof; a retardation film for circularly polarized light provided outside the reflection-type polarizing film; a cholesteric liquid crystal polymer sheet provided outside the retardation film for circularly polarized light; and a light absorbing film provided outside the cholesteric liquid crystal polymer sheet.

In these liquid crystal display devices, a light diffusing layer or a light diffusing sheet can be provided on an outer surface of the polarizing film.

Additionally, to achieve the above-mentioned third object, the present invention uses a translucent light absorbing film as the light absorbing film and a backlight is provided outside the translucent light absorbing film.

To achieve the above-mentioned second object, a liquid crystal display device according to the present invention uses three PA liquid crystal elements, each of which is arranged to sandwich a nematic liquid crystal with zero-degree twist alignment between a first substrate having a first electrode and a second substrate having a second electrode, a retardation film for circularly polarized light is provided outside the second substrate of a first PA liquid crystal element, a polarizing film provided outside the retardation film for circularly polarized light, a first cholesteric liquid crystal polymer sheet, a second PA liquid crystal element, a second cholesteric liquid crystal polymer sheet, a third PA liquid crystal element, a third cholesteric liquid crystal polymer sheet, and a light absorbing film are sequentially disposed outside the first substrate, and the first, second, and third cholesteric liquid crystal polymer sheets have scattering center wavelengths different from one another to thereby compose a color liquid crystal display device which enables multi-color display.

Alternatively, three TN liquid crystal elements are used, a polarizing film is provided outside a second substrate of a first TN liquid crystal element, a first retardation film for circularly polarized light, a first cholesteric liquid crystal polymer sheet, a second retardation film for circularly polarized light, a second TN liquid crystal element, a third retardation film for circularly polarized light, a second cholesteric liquid crystal polymer sheet, a fourth retardation film for circularly polarized light, a third TN liquid crystal element, a fifth retardation film for circularly polarized light, a third cholesteric liquid crystal polymer sheet, and a light absorbing film are sequentially disposed outside a first substrate of the first TN liquid crystal element, and the first, second, and third cholesteric liquid crystal polymer sheets have scattering center wavelengths different from one another to thereby also compose a color liquid crystal display device which enables multi-color display.

The above and other objects, features and advantages of the invention will be apparent from the following detailed description which is to be read in conjunction with the accompanying drawings.

BRIEF DESCRIPTION OF THE DRAWINGS

FIG. 23 is a table showing a relationship between a combination of on/off states of each liquid crystal component and displayed colors in the liquid crystal display device;

DETAILED DESCRIPTION OF THE PREFERRED EMBODIMENTS

The preferred embodiments of a liquid crystal display device according to the present invention will hereinafter be described with reference to the accompanying drawings.

First Embodiment FIG. 1 to FIG. 4

First, a first embodiment of a liquid crystal display device according the present invention will be described. The structure thereof will be described with reference to FIG. 1 and FIG. 2.

Figure 1:
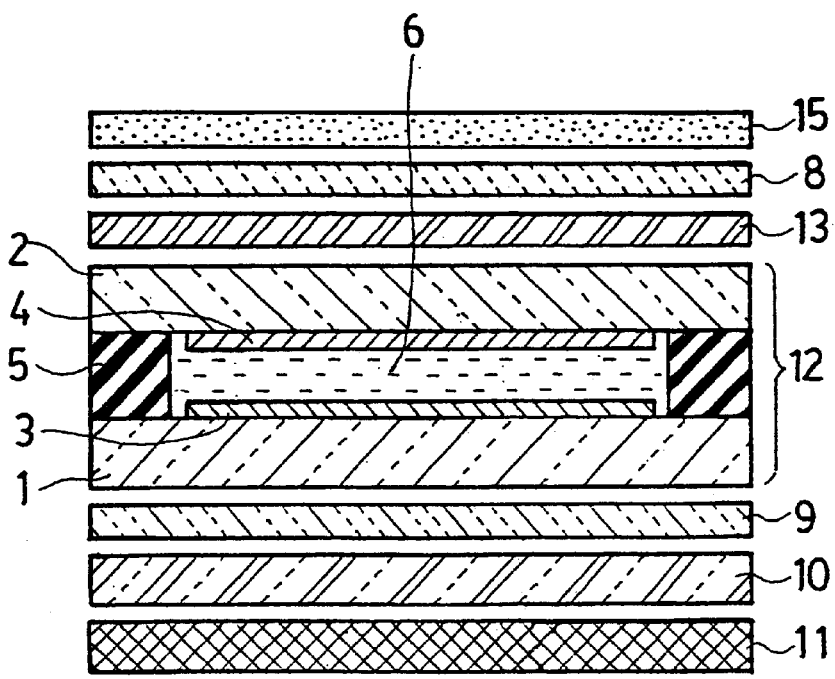
FIG. 1 is a schematic sectional view to illustrate the structure of a liquid crystal display device of a first embodiment according to the present invention.
Figure 2:
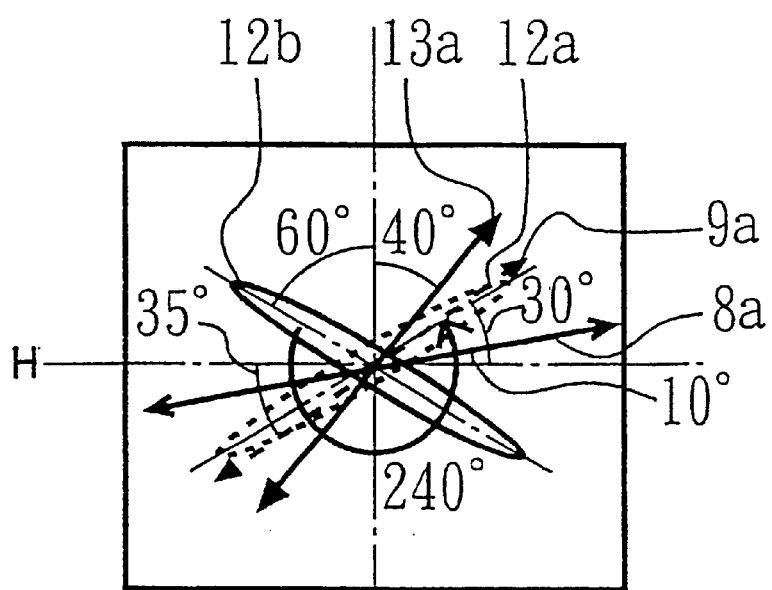
FIG. 2 is a plane view to illustrate the disposition relationship of the components thereof.

FIG. 1 is a schematic sectional view to illustrate the structure of the liquid crystal display device and FIG. 2 is a plane view to illustrate the disposition relationship of the components thereof.

The liquid crystal display device utilizes an STN (super twisted nematic) liquid crystal element 12 shown in FIG. 1. The STN liquid crystal element 12 is formed such that a first substrate 1, made of a glass sheet having a thickness of 0.7 mm on which a transparent first electrode 3 composed of indium-tin oxide (ITO) is formed, and a second substrate 2, made of a glass sheet having a thickness of 0.7 mm on which a second electrode 4 also composed of ITO is formed, are bonded by a sealing material 5 to sandwich a nematic liquid crystal 6 twist-aligned at a twist angle of 240 degrees between a pair of substrates 1 and 2.

As shown in FIG. 1, a retardation film 13 is provided outside (upper side in FIG. 1) the second substrate 2 in the STN liquid crystal element 12, a polarizing film 8 is provided outside the retardation film 13, and a light diffusing sheet 15 serving as a light diffusing layer is provided outside the polar film 8.

A retardation film 9 for circularly polarized light is provided outside (lower side in FIG. 1) the first substrate 1 in the SIN liquid crystal element 12, a cholesteric liquid crystal polymer sheet 10 is provided outside the retardation film 9 for circularly polarized light, and a light absorbing film 11 is provided outside the cholesteric liquid crystal polymer sheet 10.

Alignment layers (not shown) are formed on respective surfaces of the first electrode 3 and the second electrode 4 in the STN liquid crystal element 12. The first substrate 1 is subjected to rubbing treatment at an angle of 30 degrees in the upper right direction in FIG. 2 to provide a lower molecular alignment direction 12a of the liquid crystal at an angle of +30 degrees with respect to the horizontal axis H serving as a reference, while the second substrate 2 is subjected to rubbing treatment at an angle of 30 degrees in the lower right direction in FIG. 2 to provide an upper molecular alignment direction 12b of the liquid crystal at an angle of −30 degrees with respect to the horizontal axis H, thereby forming the STN liquid crystal element 12 having a twist alignment at a twist angle of 240 degrees counter-clockwise.

A difference in birefringence Δn of the nematic liquid crystal 6 used is 0.15. A cell gap d which is a gap between the first substrate 1 and the second substrate 2 is set to be 5.4 μm.

Thus, the value of And of the liquid crystal element, expressed by the product of the difference in birefringence An of the nematic liquid crystal 6 and the cell gap d, is 810 nm. A twist pitch of the nematic liquid crystal 6 is adjusted to be 11 μm.

In FIG. 1, the polarizing film 8 is disposed above the STN liquid crystal element 12 such that the transmittable axis 8a shown in FIG. 2 is at an angle of +10 degrees with respect to the horizontal axis H. The retardation film 13 having a phase difference value of 550 nm is disposed between the STN liquid crystal element 12 and the polarizing film 8 such that the phase delay axis 13a shown in FIG. 2 is at an angle of 50 degrees with respect to the horizontal axis H.

The retardation film 9 for circularly polarized light is disposed below the STN liquid crystal element 12 such that the phase delay axis 9a shown in FIG. 2 is at an angle of +35 degrees with respect to the horizontal axis H.

The cholesteric liquid crystal polymer sheet 10 is disposed below the retardation film 9 for circularly polarized light and black paper is disposed as he light absorbing film 11 below the cholesteric liquid crystal polymer sheet 10.

The STN liquid crystal element 12, the retardation film 9 for circularly polarized light, and the cholesteric liquid crystal polymer sheet 10 are bonded using an acrylic-based adhesive. The polarizing film 8, the retardation film 13, and the STN liquid crystal element 12 are also bonded using an acrylic-based adhesive.

The light diffusing sheet 15, disposed as a light diffusing layer outside the polarizing film 8, prevents reflection from a surface and diffuses reflected light after being selectively scattered to look as if it passed through frosted glass, thus providing visually improved display.

For the retardation film 13, a biaxial retardation film, in which the relationship of nx>nz>ny is satisfied, is utilized to improve the viewing angle characteristic, where nx represents a refractive index in the phase delay axis direction, ny represents a refractive index in the Y axis direction, and nz represents a refractive index in the thickness direction. However, a uniaxial retardation film can, of course, be utilized without causing any problem.

The cholesteric liquid crystal polymer sheet 10 is a sheet formed by performing aligning treatment on a base film made of a triacetylcellulose (TAC) film having a thickness of 80 μm, coating it with a cholesteric liquid crystal polymer, adjusting the liquid crystal to have a planar alignment parallel to the base film with a twist pitch P=0.37 μm at a high temperature which causes a liquid crystal phase, and then cooling it to a temperature below the transition temperature of the glass to be solidified.

Thus, the central axis of the twist is perpendicular to the base film. Incidentally, if the cholesteric liquid crystal polymer sheet 10 and the light absorbing film 11 were arranged at any angle, this would not affect display characteristics so that they are omitted in the plane view of FIG. 2.

Next, the function for displaying colors in the liquid crystal display device according to the first embodiment will be described with reference to FIG. 3 and FIG. 4 as well.

Figure 3:
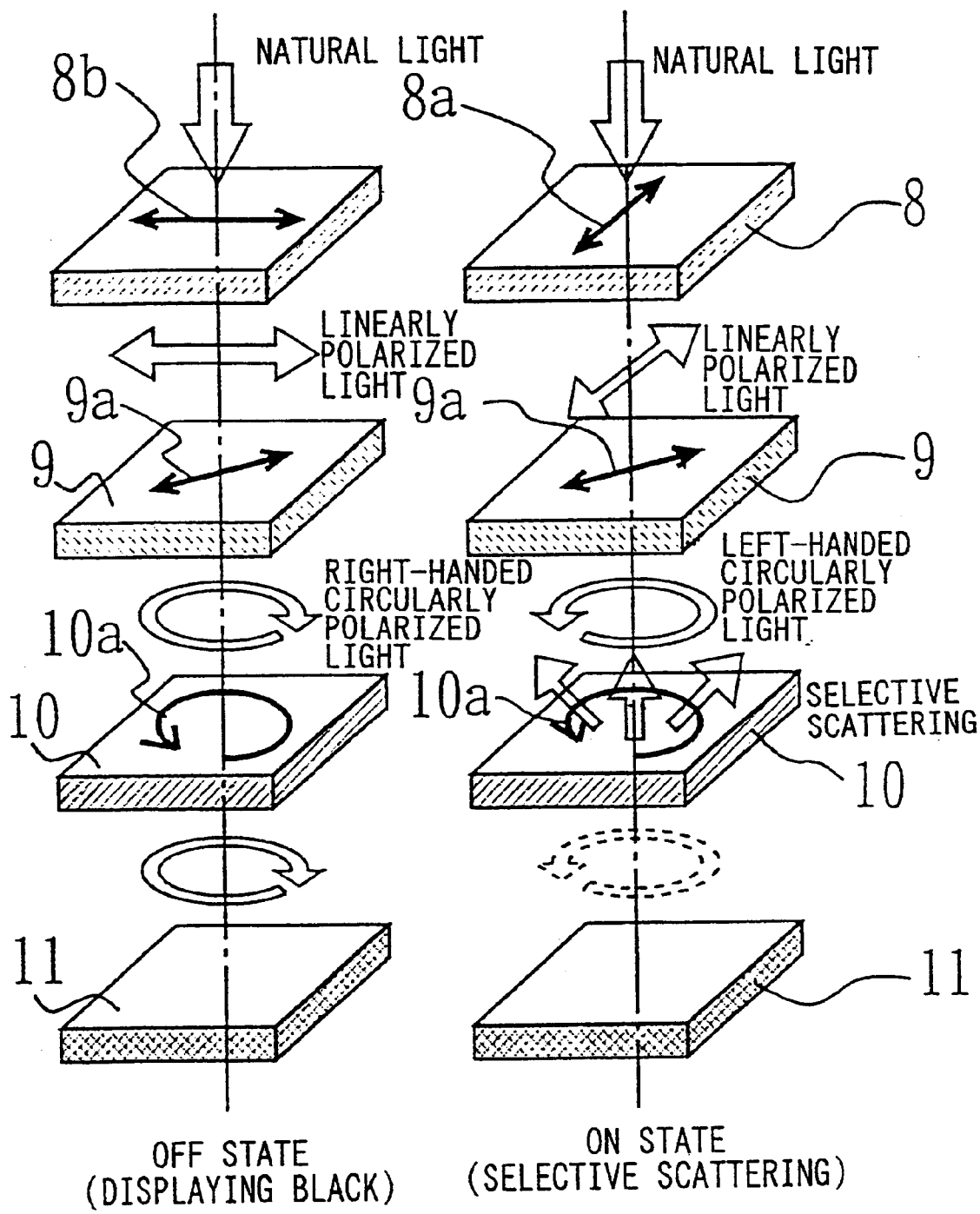
FIG. 3 is an explanatory view for a color display function of the liquid crystal display device of the first embodiment according to the present invention.

FIG. 3 is a perspective view to illustrate the coloring mechanism in the liquid crystal display device according to the first embodiment.

In the liquid crystal display device, when no voltage is applied, linearly polarized light in the direction of the transmittable axis 8a entered from the polarizing film 8 is changed into a state of elliptic polarized light after being transmitted through the STN liquid crystal element 12 in the absence of the retardation film 13. The elliptic polarized light can not be changed into circularly polarized light even after passing through the retardation film 9 for circularly polarized light, resulting in an insufficient display.

However, the retardation film 13 is arranged between the polarizing film 8 and the STN liquid crystal element 12 so that linearly polarized light entering into the retardation film 13 from the polarized film 8 is changed into a state of elliptic polarized light.

The elliptic polarized light is corrected during the transmission through the STN liquid crystal element 12 and is emitted in a position rotated approximately 70 degrees with respect to the transmittable axis 8a of the polarizing film 8 in the form of substantially linearly polarized light.

The phase delay axis 9a of the retardation film 9 for circularly polarized light shown in FIG. 2 is disposed at an angle of +35 degrees with respect to the horizontal axis. Since the linearly polarized light enters into the retardation film 9 for circularly polarized light at an angle of 45 degrees counterclockwise with respect to the phase delay axis 9a, the light is changed into left-handed circularly polarized light turning counterclockwise as shown in "on state" on the right side in FIG. 3. This is the same as a twist direction 10a of the cholesteric liquid crystal polymer sheet 10. Thus, light in a scattering band width $\Delta\lambda$ centering on a scattering center wavelength $\lambda c$ is reflected by selective scattering while light other than that in the scattering band width $\Delta\lambda$ is transmitted and then absorbed by the light absorbing film 11, thereby obtaining a bright reflection color.

When the refractive index of the cholesteric liquid crystal polymer sheet 10 is defined as n and the twist pitch of the cholesteric liquid crystal polymer 10 as P, the scattering center wavelength is derived as $\lambda c = n \times P$.

In this first embodiment, since a cholesteric liquid crystal polymer of n=1.65 and P=0.37 $\mu$m having a left-handed twist is used, the scattering center wavelength $\lambda c$ is 0.61 $\mu$m, thereby exhibiting a reflection color of a metallic gold color.

Next, when a voltage is applied between the first electrode 3 and the second electrode 4, molecules of the nematic liquid crystal 6 rise to change the birefringence in the STN liquid crystal element 12. The emitted linearly polarized light is therefor rotated approximately 90 degrees to be changed in direction at an angle of −10 degrees with respect to the horizontal axis.

Thus, as shown in "off state" on the left side in FIG. 3, the linearly polarized light transmitted through the STN liquid crystal element 12 enters into the retardation film 9 for circularly polarized light at an angle of 45 degrees clockwise with respect to the phase delay axis 9a to be changed into right-handed circularly polarized light. This is opposite to the twist direction 10a in the cholesteric liquid crystal polymer sheet 10 so that no selective scattering occurs to cause all of the incident right-handed circularly polarized light to be transmitted through the cholesteric liquid crystal polymer sheet 10 and then absorbed by the light absorbing film 11, causing black display.

Figure 4:
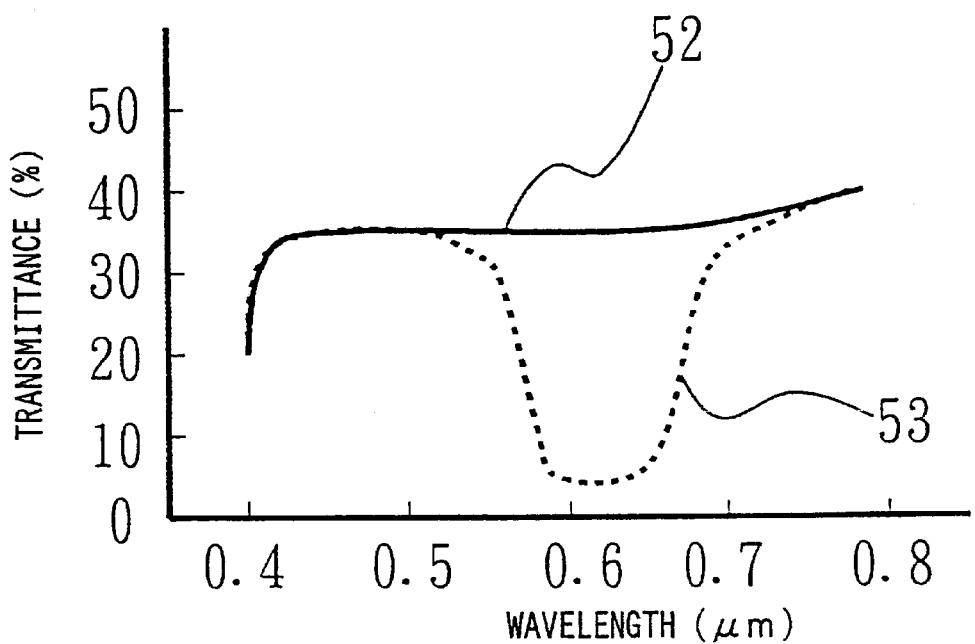
FIG. 4 is a diagram showing a relationship between the wavelength of incident light and the transmittance in the liquid crystal display device.

FIG. 4 shows a relationship between the wavelength of incident light and the transmittance in the liquid crystal display device used in the first embodiment. A solid line curve 52 represents the transmittance when a black color is displayed in a voltage applied state and a broken line curve 53 represents the transmittance when the selective scattering occurs in a no-voltage state, respectively.

In the no-voltage state, as shown in the curve 53, it is shown that left-handed circularly polarized light in a scattering band width ranging from 0.56 $\mu$m to 0.67 $\mu$m centering on a scattering center wavelength $\lambda c$=0.61 $\mu$m is reflected while light having a wavelength other than the scattering band width is transmitted without being reflected.

By absorbing the transmitted light in the light absorbing film 11 to prevent the light from returning to the surface, a bright gold color can be obtained with the reflected light due to the selective scattering.

In the voltage applied state, as shown in the curve 52, almost all of the light transmitted through the polarizing film 8 is transmitted through the STN liquid crystal element 12 and the cholesteric liquid crystal polymer sheet 10. Thus, all the light is absorbed by the light absorbing film 11, causing black display.

Also, since the STN liquid crystal element 12 is used as a liquid crystal element, the deformation of the molecular alignment of the nematic liquid crystal 6 is more sensitive to an applied voltage, resulting in sharper optical characteristics. Thus, the viewing angle characteristic is improved and the number of scanning lines can be increased ranging from 100 to even 400 under simple matrix driving, making it possible to provide a large liquid crystal display device and a high-density liquid crystal display device.

Additionally, in the first embodiment, since the light diffusing sheet 15 is provided as a light diffusing layer outside the polarizing film 8 as shown in FIG. 1, metallic colors are scattered by the diffusing sheet 15 to cause a mirror-like display to appear in soft colors as viewed through frosted glass. The viewing angle characteristic is also improved to achieve visually favorable display for the liquid crystal display device.

Although the first embodiment uses the light diffusing sheet 15 formed by coating a polycarbonate film with a mixture of acrylic beads in an adhesive as a light diffusing layer, the light diffusing sheet 15 can be formed by performing embossing treatment on the surface of the base film or by dispersing light diffusing particles in the base film.

The light diffusing sheet 15 preferably has a scattering strength in the haze value ranging from 30 to 90, and has a total light ray transmittance at a relatively high value ranging from 80 to 90%.

In this way, the above-described structure composed of the poling film 8, the retardation film 13, the STN liquid crystal element 12, the retardation film 9 for circularly polarized light, the cholesteric liquid crystal polymer sheet 10, and the light absorbing film 11 realizes a liquid crystal display device which achieves high-density display with several hundreds of scanning lines, higher contrast display in a bright reflection color and a black color, and single-color display with an improved viewing angle characteristic.

Modifications of the First Embodiment

In the first embodiment, a cholesteric liquid crystal polymer having the pitch P=0.37 $\mu$m is used to provide a liquid crystal display device for display in gold and black. A change in the pitch P allows the color tone of the reflection light to be optionally varied. For example, a liquid crystal display device for blue and black display is obtained with the liquid crystal pitch P=0.3 $\mu$m (the scattering center wavelength $\lambda c$=0.49 $\mu$m), and a liquid crystal display device for green and black display is obtained with the pitch P=0.32 $\mu$m (the scattering center wavelength $\lambda c$=0.53 $\mu$m).

The first embodiment provides colored display in a no-voltage state and black display in a voltage-applied state. However, the black display in a no-voltage state and the colored display in a voltage-applied state can be provided by rotating the transmittable axis 8a of the polarizing film 8 by 90 degrees to be arranged in the same direction as the lower molecular alignment direction 12a of the liquid crystal shown in FIG. 2.

Alternatively, black display in a no-voltage state and colored display in a voltage-applied state can be provided by rotating the phase delay axis 9a of the retardation film 9 for circularly polarized light by 90 degrees.

Although a STN liquid crystal element having a twist alignment at a twist angle of 240 degrees is used as the SIN liquid crystal element 12 in the first embodiment, similar effects can be obtained using any STN liquid crystal element as long as it has a twist alignment at a twist angle ranging from 180 to 270 degrees.

In the first embodiment, only one retardation film 13 is used to return the elliptic polarized light obtained by the STN liquid crystal element 12 to linearly polarized light. However, a plurality of retardation films can be used to obtain more linearly polarized light, providing more favorable black display and colored display.

A plurality of the retardation films can be disposed on one side of the STN liquid crystal element 12 or on both sides thereof.

In the first embodiment, although the retardation film 13 is used to return the elliptic polarized light obtained by the STN liquid crystal element 12 to the linearly polarized light, a twisted retardation film can be used instead of the retardation film 13 to return the elliptic polarized light to more linearly polarized light, thus obtaining more favorable black display and colored display. In this case, the twisted retardation film preferably has a twist angle equal to or smaller than the twist angle of the STN liquid crystal element 12 by an angle ranging from 10 to 30 degrees, and a twist direction opposite to the twist direction of the STN liquid crystal element 12.

When a twisted retardation film having a twist angle of 220 degrees clockwise and Δnd of 610 nm is used instead of the retardation film 13 in FIG. 1, more favorable black display and colored display are obtained.

In the first embodiment, the diffusing sheet 15 is provided outside the polarizing film 8 to scatter metallic colors and improve visibility. However, even though the diffusing sheet 15 is not used, the performance of the display device is not deteriorated although the display is slightly darker.

Similar effects can be obtained by coating the surface of the base film of the polarizing film 8 with a light diffusing layer made of silica particles mixed in an adhesive instead of the light diffusing sheet 15. The light diffusing layer can be formed by dispersing particles such as acrylic beads or calcium powder into an adhesive, or another light dispersing sheet can be attached. Alternatively, the surface of the base film can be subjected to an embossing treatment.

Instead of the STN liquid crystal element 12, a TN (twisted nematic) liquid crystal element having a twist alignment at a twist angle of approximately 90 degrees can be used as a liquid crystal element. In this case, visibility can also be improved with a light diffusing sheet or a scattering layer provided on the surface of a polarizing film.

In the first embodiment, although black paper is used as the light absorbing film 11, a solar battery having a black color surface can be used to provide display by a liquid crystal without reducing the power generating efficiency of the solar battery.

Figure 5:
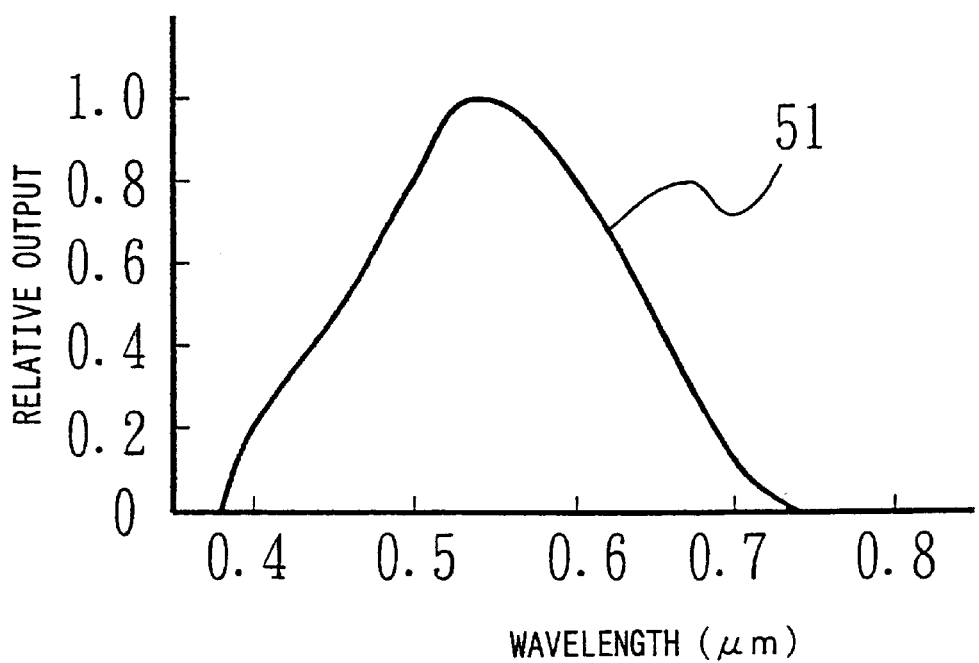
FIG. 5 is a diagram showing power generating efficiency characteristics of a solar battery used in the first embodiment according to the present invention.

FIG. 5 shows the power generation efficiency in an amorphous solar battery with a curve 51. The power generation efficiency has a peak near a wavelength of 0.55 μm, but good power generation is attained over the entire range of visible rays.

Therefore, if the liquid crystal display device of the first embodiment from which the light absorbing film 11 is eliminated is disposed on a solar battery, an amount of light equal to or greater than 35% is absorbed by the solar battery and sufficient power generation efficiency is provided for use in digital watches in a voltage applied state as shown by the curve 52 in FIG. 4.

In a no-voltage state, light having a wavelength equal to or greater than 0.56 μm is reflected and does not reach the solar battery. However, the decrease in the power generation efficiency can be suppressed by setting the scattering center wavelength λc at a wavelength other than 0.55 μm which is the peak wavelength in the power generation efficiency shown by the curve 51 in FIG. 5.

Second Embodiment: FIG. 6 to FIG. 9

Next, a second embodiment of the liquid crystal display device according to the present invention will be described.

Figure 6:
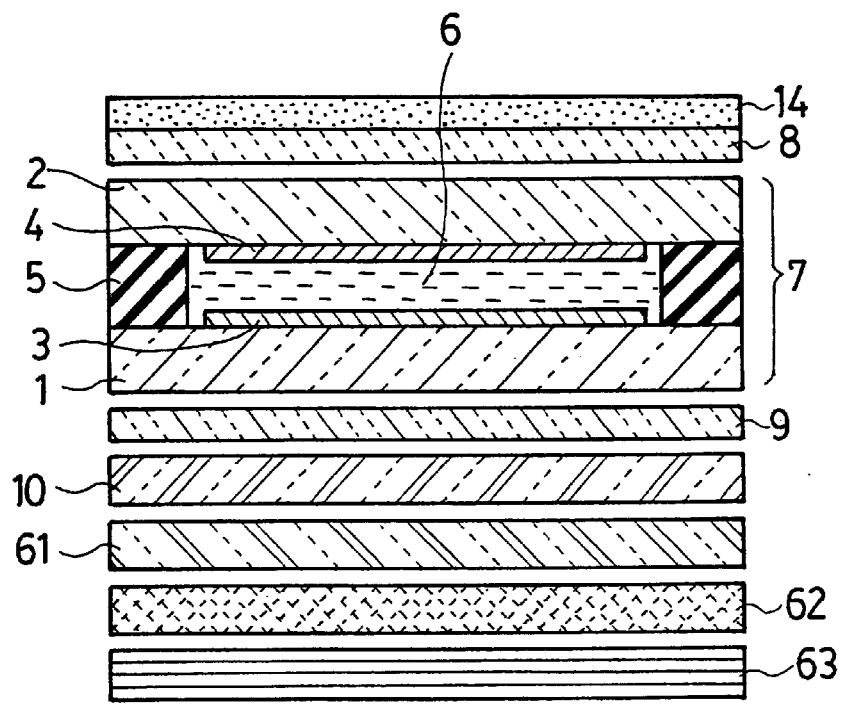
FIG. 6 is a schematic sectional view to illustrate the structure of a liquid crystal display device of a second embodiment according to the present invention.
Figure 7:
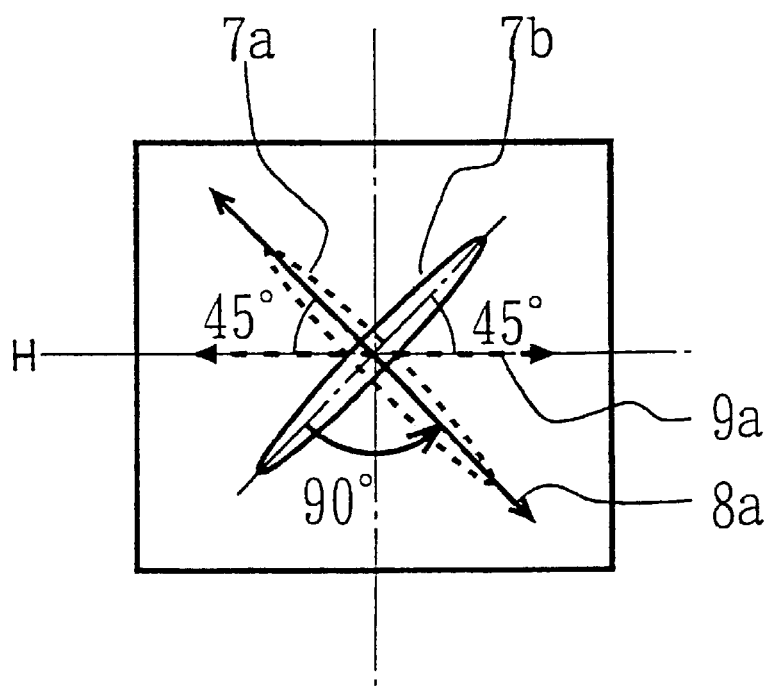
FIG. 7 is a plane view to illustrate the disposition relationship of the components thereof.

FIG. 6 is a schematic sectional view to illustrate the structure of the liquid crystal display device and FIG. 7 is a plane view to illustrate the disposition relationship of the components thereof. Incidentally, in FIG. 6 and FIG. 7, components identical to those in FIG. 1 and FIG. 2 of the first embodiment as described above are designated by the same reference numerals and symbols, and detailed description thereof is omitted.

The liquid crystal display device in the second embodiment differs from the liquid crystal display device in the first embodiment in that a plurality of cholesteric liquid crystal polymer sheets are used, a translucent light absorbing film is used as a light absorbing film, a backlight for illumination is provided, and a TN liquid crystal element is used as a liquid crystal element The liquid crystal display device shown in FIG. 6 uses a TN liquid crystal element 7 which is formed such that a first substrate 1, made of a glass sheet having a thickness of 0.7 mm on which a first electrode 3 composed of ITO is formed, and a second substrate 2, made of a glass sheet having a thickness of 0.7 mm on which a second electrode 4 composed of ITO is formed, are bonded by a sealing material 5 to sandwich a nematic liquid crystal 6 having a twist alignment at a twist angle of 90 degrees between a pair of the substrates 1 and 2.

Alignment layers (not shown) are formed on respective surfaces of the first electrode 3 and the second electrode 4. The first substrate 1 is subjected to rubbing treatment at an angle of 45 degrees in the lower right direction in FIG. 7 to provide a lower molecular alignment direction 7a of the liquid crystal at an angle of −45 degrees with respect to the horizontal axis H serving as a reference, while the second substrate 2 is subjected to rubbing treatment at an angle of 45 degrees in the upper right direction to provide an upper molecular alignment direction 7b of the liquid crystal at an angle of +45 degrees with respect to the horizontal axis H, thereby forming the TN liquid crystal element 7 having a twist alignment at a twist angle of 90 degrees counterclockwise.

A difference in birefringence Δn of the nematic liquid crystal 6 used is 0.15. A cell gap d which is a gap between the first substrate 1 and the second substrate 2 is set to be 8 μm.

Thus, the value of Δnd of the liquid crystal element, expressed by the product of the difference Δn in birefringence of the nematic liquid crystal 6 and the cell gap d, is 1200 nm. A value of Δnd lower than 500 nm is not preferable since the optical rotatory power is reduced. The value of Δnd should preferably be equal to or higher than 800 nm.

The transmittable axis 8a of the polarizing film 8 shown in FIG. 7 is disposed at an angle of 45 degrees in the lower right direction, which is the same as the lower molecular alignment direction 7a of the liquid crystal in the IN liquid crystal element 7. The phase delay axis 9a of the retardation film 9 for circularly polarized light is disposed in a horizontal direction.

As shown in FIG. 6, a first cholesteric liquid crystal polymer sheet 10 is disposed outside (lower side in FIG. 6) the retardation film 9 for circularly polarized light and a second cholesteric liquid crystal polymer sheet 61 is disposed outside the first cholesteric liquid crystal polymer 10.

The TN liquid crystal element 7, the retardation film 9 for circularly polarized light, the first cholesteric liquid crystal polymer sheet 10, and the second cholesteric liquid crystal polymer sheet 61 are bonded using an acrylic-based adhesive.

A black color polyethylene sheet is disposed as a translucent light absorbing film 62 outside (lower side in FIG. 6) the second cholesteric liquid crystal polymer sheet 61. The translucent light absorbing film 62 has a black color but has a transmittance ranging from 10 to 30%.

Additionally, a backlight 63 using an electroluminescence (EL) emitter is provided the outside the translucent light absorbing film 62. By turning on the backlight 63, the liquid crystal display device can be used even at night.

The polarizing film 8 is bonded on an upper surface of the TN liquid crystal element 7 using an acrylic-based adhesive. A light diffusing layer 14 is formed on a surface of the polarizing film 8 to prevent reflection in a surface as well as diffuse mirror-like reflected light after being selectively scattered to look as if it passed through frosted glass, thus providing visually improved display.

The first cholesteric liquid crystal polymer sheet 10 is the same as that used in the first embodiment, and has a refractive index n=1.65 and a twist pitch P=0.37 $\mu$m having a left-handed twist.

Thus, the scattering center wavelength $\lambda c$ is 0.61 $\mu$m. When only the first cholesteric liquid crystal polymer sheet 10 is used, the reflection color exhibits a gold color.

The second cholesteric liquid crystal polymer sheet 61 has a refractive index n=1.65 and a twist pitch P=0.32 $\mu$m having a left-handed twist.

Thus, the scattering center wavelength $\lambda c$ is 0.53 $\mu$m. When only the second cholesteric liquid crystal polymer sheet 61 is used, the reflection color exhibits a green color.

Incidentally, if the first cholesteric liquid crystal polymer sheet 10, the second cholesteric liquid crystal polymer sheet 61, the translucent light absorbing film 62, and the backlight 63 were arranged at any angle, this would not affect display characteristics so that the illustration thereof is omitted in the plane view of FIG. 7.

Next, the function for displaying colors in the liquid crystal display device of the second embodiment will be described with reference to FIG. 8 and FIG. 9 as well.

Figure 8:
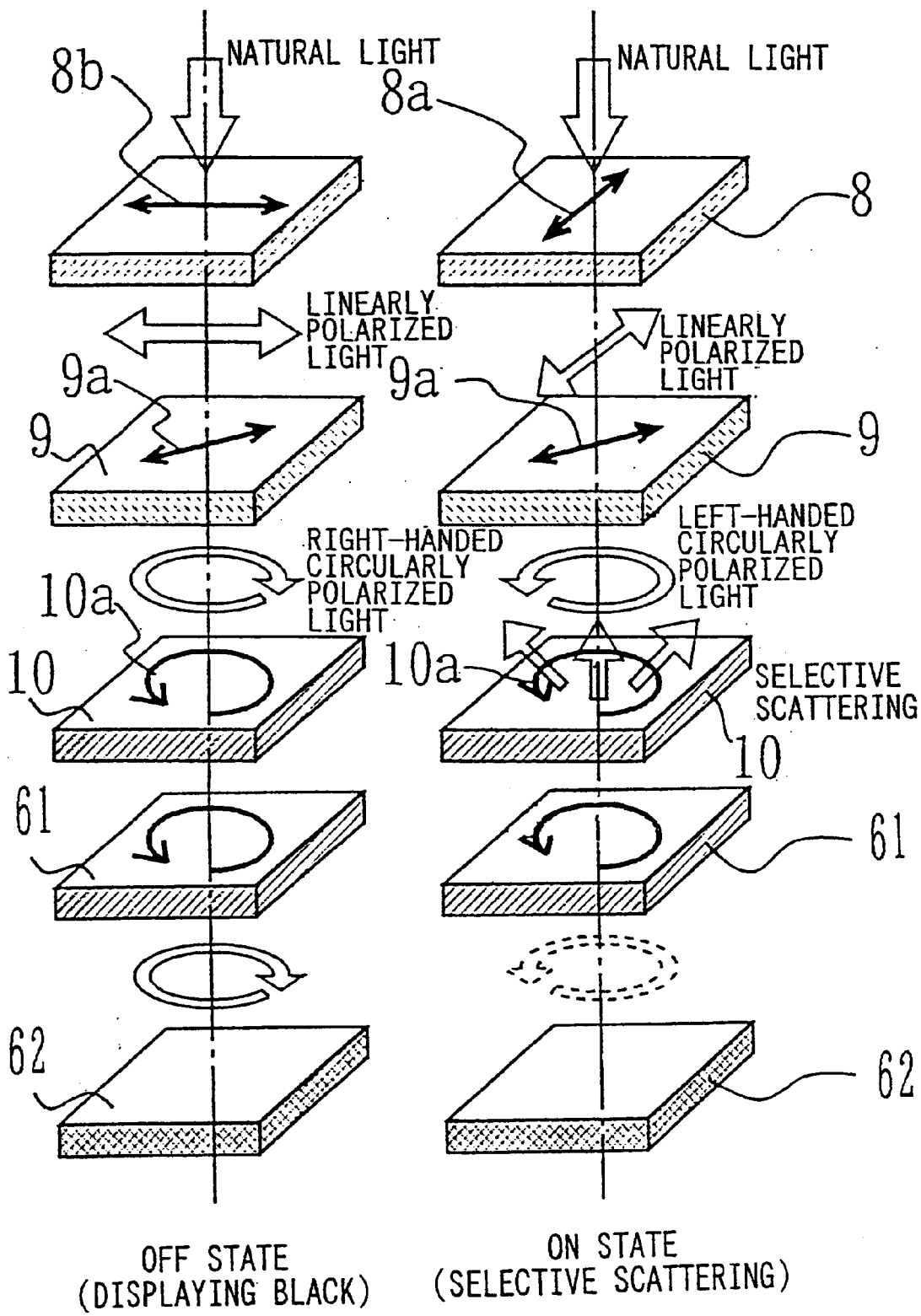
FIG. 8 is an explanatory view for a color display function of the liquid crystal display device of the second embodiment according to the present invention.

FIG. 8 is a perspective view to illustrate the coloring mechanism in the liquid crystal display device of the second embodiment.

In the liquid crystal display device, when no voltage is applied, linearly polarized light in the direction of the transmittable axis 8a shown in FIG. 7 from the polarizing film 8 enters into the TN liquid crystal element 7 in the lower molecular alignment direction 7a of the liquid crystal in the TN liquid crystal element 7, is rotated 90 degrees by the TN liquid crystal element 7, and is emitted in the upper molecular alignment direction 7b of the liquid crystal.

Thus, the light enters into the retardation film 9 for circularly polarized light at an angle of 45 degrees counter-clockwise to be changed into left-handed circularly polarized light as shown in "on state" on the right side in FIG. 8. This is the same as twist direction 10a in the first cholesteric liquid crystal polymer sheet 10 so that light in a scattering band width $\Delta\lambda$ centering on a scattering center wavelength $\lambda c=0.61$ $\mu$m is reflected with selective scattering.

The left-handed circularly polarized light other than the scattering band width $\Delta\lambda$ is transmitted through the first cholesteric liquid crystal polymer sheet 10. Within the transmitted left-handed circularly polarized light, the light having in a scattering band width $\Delta\lambda$ centering on a scattering center wavelength $\lambda c=0.53$ $\mu$m is reflected by the second cholesteric liquid crystal polymer sheet 61.

The light transmitted through the second cholesteric liquid crystal polymer sheet 61 is absorbed by the translucent light absorbing film 62, obtaining a bright metallic and whitish-golden reflection color.

Next, when a voltage is applied between the first electrode 3 and the second electrode 4, molecules of the nematic liquid crystal 6 rise to lose their optical rotatory power and the linearly polarized light entering in the lower molecular alignment direction 7a of the liquid crystal passes through the TN liquid crystal element 7 without being rotated.

Thus, the linearly polarized light transmitted through the TN liquid crystal element 7 enters into the retardation film 9 for circularly polarized light at an angle of 45 degrees clockwise with respect to the phase delay axis 9a to be changed into right-handed circularly polarized light as shown in "off state" on the left side in FIG. 8.

Since liquid crystal polymer sheets having a left-handed twist are used as the first cholesteric liquid crystal polymer sheet 10 and the second cholesteric liquid crystal polymer sheet 61, no selective scattering occurs and all the incident right-handed circularly polarized light is transmitted through the first cholesteric liquid crystal polymer sheet 10 and the second cholesteric liquid crystal polymer sheet 61 and then is absorbed by the translucent light absorbing film 62, thus providing black display.

Figure 9:
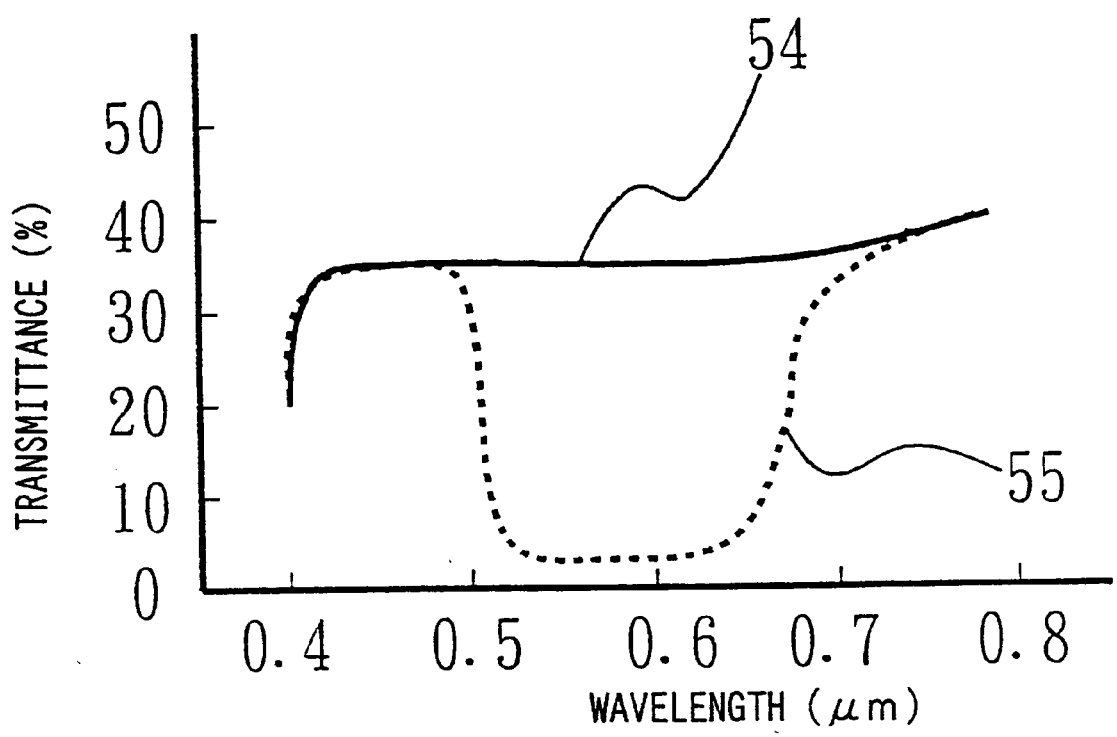
FIG. 9 is a diagram showing a relationship between the wavelength of incident light and the transmittance in the liquid crystal display device.

FIG. 9 shows a relationship between the wavelength of incident light and the transmittance in the liquid crystal display device of the second embodiment. A solid line curve 54 represents the transmittance in a voltage applied state and a broken line curve 55 represents the transmittance when the selective scattering occurs in a no-voltage state, respectively.

In the no-voltage state, as shown in curve 55, it is shown that left-handed circularly polarized light having a wavelength ranging from 0.49 $\mu$m to 0.67 $\mu$m is reflected while light having a wavelength other than the range is transmitted without being reflected. Therefore, the transmitted light is absorbed by the translucent light absorbing film 62 to prevent the light from returning to the surface, allowing a bright metallic and whitish-gold color to be displayed with the reflected light due to the selective scattering.

On the other hand, in the voltage applied state, almost all of the light transmitted through the polarizing film 8 is transmitted through the TN liquid crystal element 7, the first cholesteric liquid crystal polymer sheet 10, and the second cholesteric liquid crystal polymer sheet 61, as shown in the curve 54.

Therefore, all of the light is absorbed by the translucent light absorbing film 62 to provide black display, achieving high contrast display.

When the backlight 63 shown in FIG. 6 is turned on to see display at night, the light of the backlight 63 is transmitted through the translucent light absorbing film 62 and then is transmitted through the area where a voltage is applied and a black color is displayed. The light of the backlight 63 is not transmitted through the remaining area where no voltage is applied with colored display.

When an EL device for generating a blue color is used as the backlight 63, the liquid crystal display device displays black characters on a whitish-gold background in the daytime while the device displays a bright blue color on a dark background at night with the backlight 63 turned on, meaning that the bright and dark relationship is reversed and good recognition at night can be obtained.

In the embodiment, the light diffusing layer 14 is provided outside the polarizing film 8. Thus, metallic colors are scattered by the light diffusing layer 14 to cause a mirror-like display to appear in soft colors as viewed through frosted glass. The viewing angle characteristic is also improved to achieve an improvement in visibility for the liquid crystal display device.

In this way, the liquid crystal display device is constituted by the polarizing film 8, the TN liquid crystal element 7, the retardation film 9 for circularly polarized light, the first cholesteric liquid crystal polymer sheet 10, the second cholesteric liquid crystal polymer sheet 61, the translucent light absorbing film 62, and the backlight 63 so that the tone of color can be optionally adjusted and a bright reflection color can be displayed in a bright ambient light location.

In a dark place, on the other hand, single-color display with favorable visibility can be obtained by turning on the backlight although dark and bright colors are displayed in reverse to those in a light place.

Modifications of the Second Embodiment

In the second embodiment, two cholesteric liquid crystal polymer sheets having different scattering center wavelengths λc are used one on the other. However, three or more cholesteric liquid crystal polymer sheets each having different scattering center wavelengths λc can be used one on the other.

For example, when three cholesteric liquid crystal polymer sheets having cholesteric liquid crystal polymer pitches P=0.3 μm (scattering center wavelength λc=0.49 μm), P=0.32 μm (λc=0.53 μm), and P=0.37 μm (λc=0.62 μm) are used one on the other, a substantially white reflection color is obtained. In this case, a black material is used as a light absorbing film to obtain a reflection-type liquid crystal display device which provides white color display on a black background or black color display on a white background.

When an amorphous solar battery is used as a light absorbing film for the liquid crystal display device using three cholesteric liquid crystal polymer sheets one on the other and the display region is colored in a white color on a black background, a favorable power generation efficiency is obtained.

Although a black paper or a black plastic sheet is used as the light absorbing fim 11 in the first embodiment or the translucent light absorbing film 62 in the second embodiment, a sheet in a deep color such as navy blue, brown, or red can be used to change the color of the background or characters into a color other than black.

Third Embodiment FIG. 10 to FIG. 13

Next, a third embodiment of the liquid crystal display device according to the present invention will be described.

Figure 10:
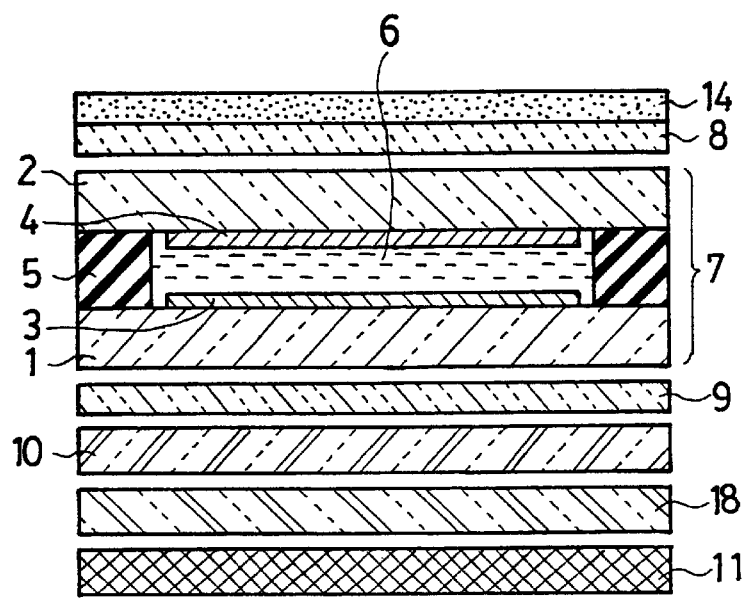
FIG. 10 is a schematic sectional view to illustrate the structure of a liquid crystal display device of a third embodiment according to the present invention.
Figure 11:
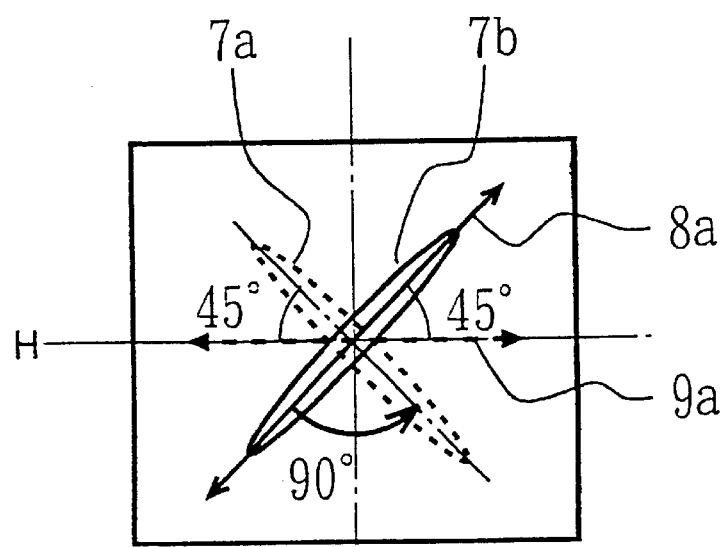
FIG. 11 is a plane view to illustrate the disposition relationship of the components thereof.

FIG. 10 is a schematic sectional view to illustrate the structure of the liquid crystal display device and FIG. 11 is a plane view to illustrate the disposition relationship of the components thereof. In FIG. 10 and FIG. 11, components identical to those in FIG. 1 and FIG. 6 are designated by the same reference numerals and symbols, and the detailed description thereof is omitted.

The structure of the liquid crystal display device according to the third embodiment is the same as that of the above-mentioned liquid crystal display device according the second embodiment, except that a twist direction in a second cholesteric liquid crystal polymer sheet is right-handed, a polarizing film 8 is disposed at a different angle, a light absorbing film similar to that in the first embodiment is provided, and a backlight is not provided.

The liquid crystal display device, as shown in FIG. 10, has the polarizing film 8 provided outside (upper side in FIG. 10) a TN liquid crystal element 7 identical to that in the second embodiment. However, the polarizing film 8 is disposed such that the transmittable axis 8a thereof shown in FIG. 11 is at an angle of 45 degrees in the upper right direction, which is the same as the upper molecular alignment direction 7b of the liquid crystal in the TN liquid crystal element 7.

A retardation film 9 for circularly polarized light is disposed below the TN liquid crystal element 7 shown in FIG. 10 such that the phase delay axis 9a shown in FIG. 11 is in the horizontal direction. Also, a first cholesteric liquid crystal polymer sheet 10 and a second cholesteric liquid crystal polymer sheet 18 are disposed below the retardation film 9 for circularly polarized light. Additionally, black paper is disposed as a light absorbing film 11 below the second cholesteric liquid crystal polymer sheet 18.

The TN liquid crystal element 7, the retardation film 9 for circularly polarized light, the first cholesteric liquid crystal polymer sheet 10 and the second cholesteric liquid crystal polymer sheet 18 are bonded using an acrylic-based adhesive.

The polarizing film 8 and the TN liquid crystal element 7 are also bonded using an acrylic-based adhesive. A diffusing layer 14 is formed on a surface of the polarizing film 8 to prevent reflection in a surface as well as diffuse reflected light after being selectively scattered to appear as viewed through frosted glass, thus attaining visually improved display.

The first cholesteric liquid crystal polymer sheet 10 is a sheet formed by performing alignment treatment on a base film made of a triacetylcellulose (TAC) film having a thickness of 80 μm, coating it with a cholesteric liquid crystal polymer having a left-handed twist, adjusting the liquid crystal to have a planar alignment parallel to the base film with a twist pitch P=0.30 μm at a high temperature which causes the liquid phase, and then cooling it to a temperature below the transition temperature of the glass to be solidified.

Thus, the central axis of the twist is perpendicular to the base film and a blue color is exhibited as a reflection color.

The second cholesteric liquid crystal polymer sheet 18 is a sheet formed by performing alignment treatment on a base film made of a triacetylcellulose (TAC) film having a thickness of 80 μm, coating it a cholesteric liquid crystal polymer with a right-handed twist, adjusting the liquid crystal to have a planar alignment parallel to the base film with a twist pitch P=0.37 μm at a high temperature which causes the liquid phase, and then cooling it to a temperature below the transition temperature of the glass to be solidified. Thus, a gold color is exhibited as a reflection color.

Incidentally, if the first cholesteric liquid crystal polymer sheet 10, the second cholesteric liquid crystal polymer sheet 18, and the light absorbing film 11 were arranged at any angle, this would not affect the display characteristics so that the illustration thereof is omitted in the plane view of FIG. 11.

Next, the function for displaying colors in the liquid crystal display device according to the third embodiment will be described with reference to FIG. 12 and FIG. 13 as well.

Figure 12:
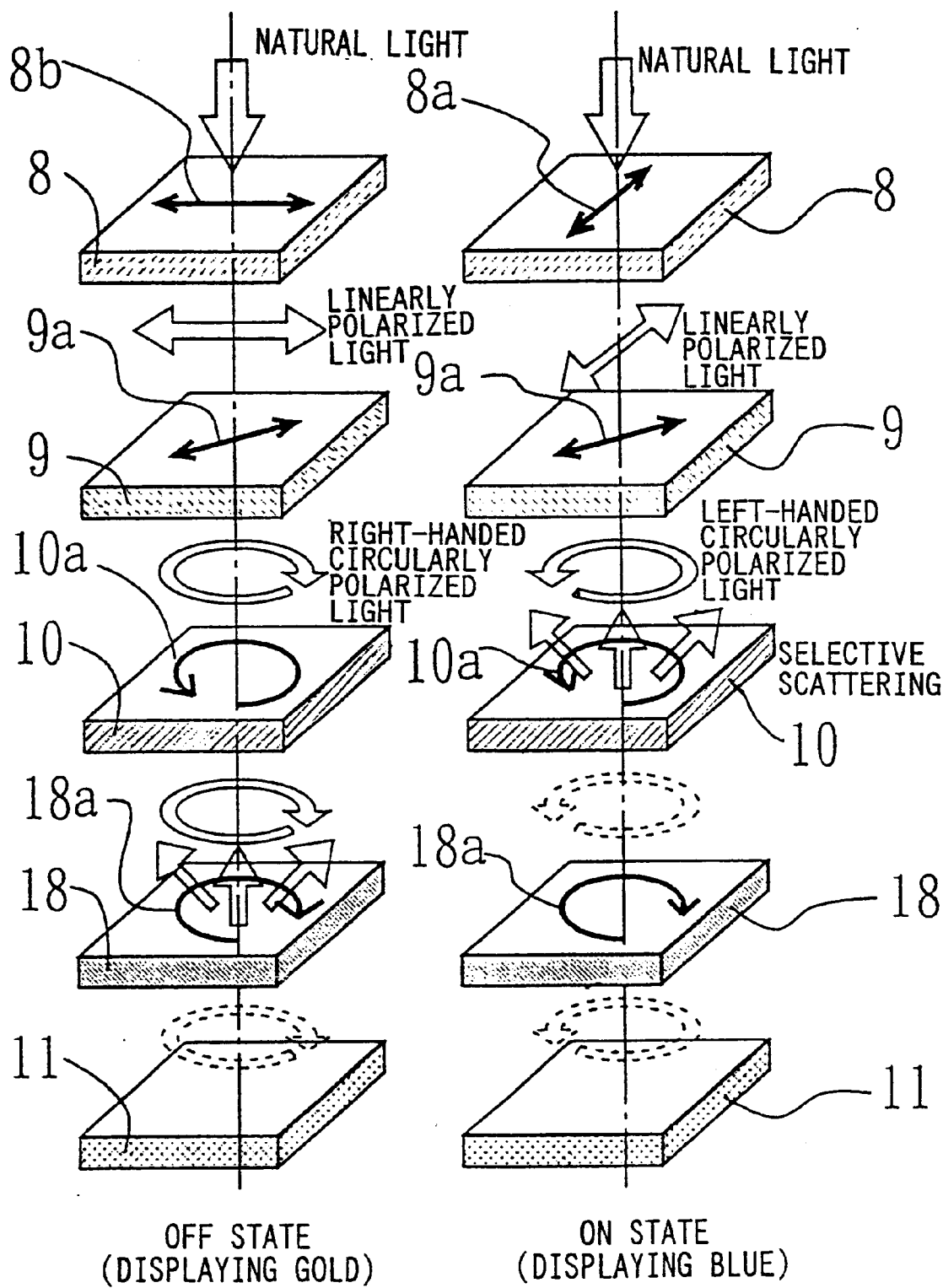
FIG. 12 is an explanatory view for a color display function of the liquid crystal display device of the third embodiment according to the present invention.

FIG. 12 is a perspective view to illustrate the coloring mechanism in the liquid crystal display device according to the third embodiment In the liquid crystal display device, in an off state with no voltage applied, linearly polarized light in the direction of the transmittable axis $8a$ shown in FIG. 11 from the polarizing film 8 enters into the TN liquid crystal element 7 in the upper molecular alignment direction $7b$ of the liquid crystal in the TN liquid crystal element 7, is rotated 90 degrees by the TN liquid crystal element 7, and is emitted in the lower molecular alignment direction $7a$ of the liquid crystal.

Thus, the light enters into the retardation film 9 for circularly polarized light at an angle of 45 degrees clockwise to be changed into right-handed circularly polarized light as shown in "off state" on the left side in FIG. 12. However, the twist direction $10a$ of the first cholesteric liquid crystal polymer sheet 10 is left-handed so that no selective scattering occurs to cause all of the incident right-handed circularly polarized light to be transmitted through the first cholesteric liquid crystal polymer sheet 10 and then entered into the second cholesteric liquid crystal polymer sheet 18.

Since the second cholesteric liquid crystal polymer sheet 18 has a right-handed twist which matches the rotating direction of the circularly polarized light incident thereon, light in a scattering band width $\Delta\lambda$ centering on a scattering center wavelength $\lambda c$ is reflected with selective scattering while light other than that of the scattering band width $\Delta\lambda$ is transmitted. The transmitted light is absorbed by the light absorbing film 11 to thereby obtain a bright background color.

Here, if the refractive index of the cholesteric liquid crystal polymer is defined as n, the twist pitch as P, the scattering center wavelength is derived as $\lambda c = n \times P$.

In the third embodiment, a cholesteric liquid crystal polymer of n=1.65 and P=0.37 $\mu$m having a right-handed twist is used as the second cholesteric liquid crystal polymer sheet 18 so that the scattering center wavelength is derived as $\lambda c = 0.61$ $\mu$m, exhibiting a reflection color of a metallic gold.

Next, when a voltage is applied between a first electrode 3 and a second electrode 4, molecules of a nematic liquid crystal 6 rise to lose their optical rotatory power. The linearly polarized light entering in the upper molecular alignment direction $7b$ of the liquid crystal passes through the TN liquid crystal element 7 with its polarization maintained.

Thus, the linearly polarized light transmitted through the TN liquid crystal element 7 enters into the retardation film 9 for circularly polarized light at an angel of 45 degrees counterclockwise with respect to the phase delay axis $9a$ shown in FIG. 11 to be changed into left-handed circularly polarized light as shown in "on state" on the right side in FIG. 12. This is the same direction as the twist direction $10a$ in the first cholesteric liquid crystal polymer sheet 10 so that light in a scattering band width $\Delta\lambda$ centering on a scattering center wavelength $\lambda c$ is reflected with selective scattering to provide colored display.

The left-handed circularly polarized light having a wavelength other Man the scattering band width $\Delta\lambda$ is transmitted through the second cholesteric liquid crystal polymer sheet 18 having a twist direction $18a$ of a right-handed twist and is then absorbed by the light absorbing film 11.

Since a cholesteric liquid crystal polymer of n=1.65 and P=0.30 $\mu$m having a left-handed twist is used as the first cholesteric liquid crystal polymer sheet 10, the scattering center wavelength is derived as $\lambda c = 0.49$ $\mu$m and the reflection color exhibits a metallic blue color.

Figure 13:
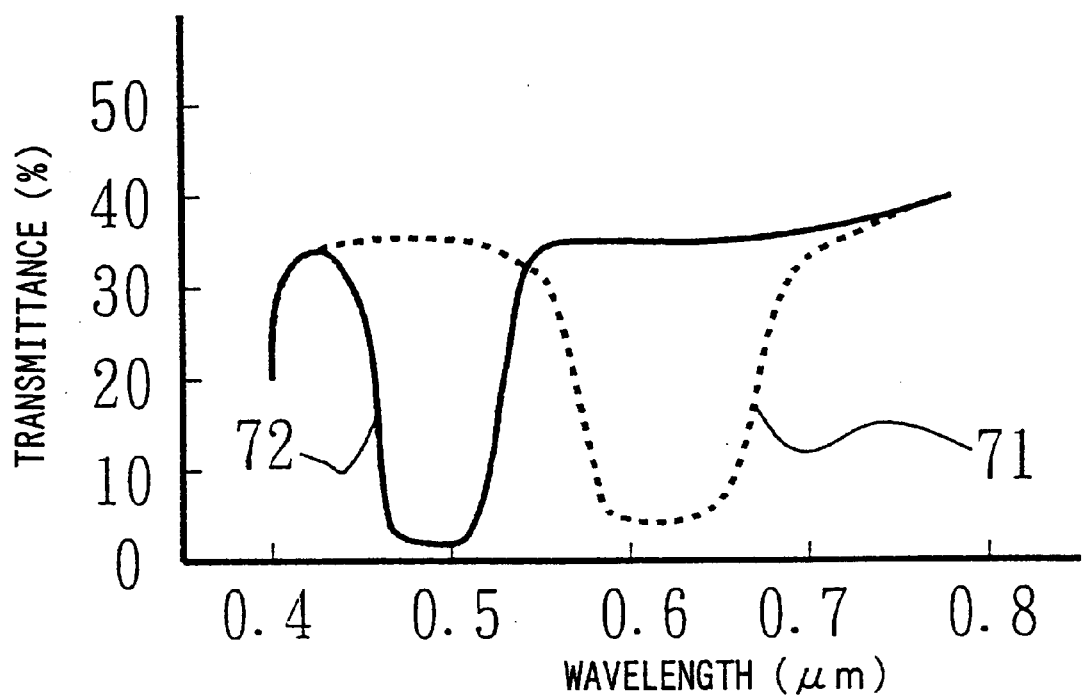
FIG. 13 is a diagram showing a relationship between the wavelength of incident light and the transmittance in the liquid crystal display device.

FIG. 13 shows a relationship between the wavelength of incident light and the transmittance in the liquid crystal display device of the third embodiment. A dotted line curve 71 represents the transmittance in a no-voltage state, i.e. in an off state, while a solid line curve 72 represents the transmittance in a voltage-applied state, i.e. in an on state.

In the no-voltage state, as shown in the curve 71, the right-handed circularly polarized light having a wavelength in a scattering band width ranging from 0.56 $\mu$m to 0.67 $\mu$m centering on a scattering center wavelength $\lambda c = 0.61$ $\mu$m is reflected while the light having a wavelength other than the scattering band width is transmitted without being reflected.

Thus, by absorbing the transmitted light in the light absorbing film 11 to prevent the light from returning to the surface, a background in a bright gold color can be displayed with the reflected light due to the selective scattering.

On the other hand, in the voltage applied state, within the light transmitted through the polarizing film 8, left-handed circularly polarized light having a wavelength in a scattering band width ranging from 0.44 $\mu$m to 0.54 $\mu$m centering on a scattering center wavelength $\lambda c = 0.49$ $\mu$m is reflected by the first cholesteric liquid crystal polymer sheet 10 while the light having a wavelength other than the scattering band width is transmitted through the second cholesteric liquid crystal polymer sheet 18 without being reflected, as shown in curve 72.

Thus, by absorbing the transmitted light in the light absorbing film 11 to prevent the light from returning to a surface, a bright metallic blue color can be displayed with the reflected light due to the selective scattering.

In the third embodiment, the light diffusing layer 14 is formed outside the polarizing film 8 to scatter mirror-like colors with the light diffusing layer, thereby causing the metallic display to appear in soft colors as viewed through frosted glass. Also, the viewing angle characteristic is improved to attain a more favorable visibility for a liquid crystal display device.

In the third embodiment, the surface of the base film of the polarizing film 8 is coated with the light diffusing layer 14 made of silica particles mixed in an adhesive. The light diffusing layer 14 can be formed by dispersing particles such as acrylic beads or calcium powder into an adhesive, or another light dispersing sheet can be attached. Alternatively, the surface of the base film can be subjected to embossing treatment.

In this way, the liquid crystal display device is constituted by the single polarizing film 8, the TN liquid crystal element 7, the retardation film 9 for circularly polarized light, the first cholesteric liquid crystal polymer sheet 10, the second cholesteric liquid crystal polymer sheet 18, and the light absorbing film 11 to thereby obtain a liquid crystal display device for multi-color display with colored display on a bright color background.

Modifications of the Third Embodiment

In the third embodiment, the first cholesteric liquid crystal polymer sheet 10 having the pitch P=0.30 $\mu$m and the second cholesteric liquid crystal polymer sheet 18 having the pitch P=0.37 $\mu$m are used to constitute the liquid crystal display device for blue color display on a gold color background. The colors, however, can be optionally changed by varying the pitch P of the cholesteric liquid crystal polymer.

For example, the first cholesteric liquid crystal polymer sheet 10 having a pitch P=0.37 μm (the scattering center wavelength λc=0.62 μm) and the second cholesteric liquid crystal polymer sheet 18 having a pitch P=0.32 μm (the scattering center wavelength λc=0.53 μm) can be used to obtain a liquid crystal display device for gold color display on a green color background.

Although a gold color is displayed by means of the second cholesteric liquid crystal polymer sheet 18 in the no-voltage state while a blue color is displayed by means of the first cholesteric liquid crystal polymer sheet 10 in the voltage-applied state in the third embodiment, a blue color background in the no-voltage state and gold color display in the voltage-applied state can be provided by rotating the transmittable axis 8a of the polarizing film 8 by 90 degrees to be arranged in the same direction as the lower molecular alignment direction 7a of the liquid crystal.

Alternatively, a blue color background in the no-voltage state and gold color display in the voltage-applied state can also be provided by rotating the phase delay axis 9a of the retardation film 9 for circularly polarized light by 90 degrees.

In addition, although the third embodiment uses black paper as the light absorbing film 11, a solar battery with a black color surface can be used to provide display utilizing a liquid crystal without reducing the power generation efficiency of the solar battery, similar to each of the above-mentioned embodiments.

Figure 14:
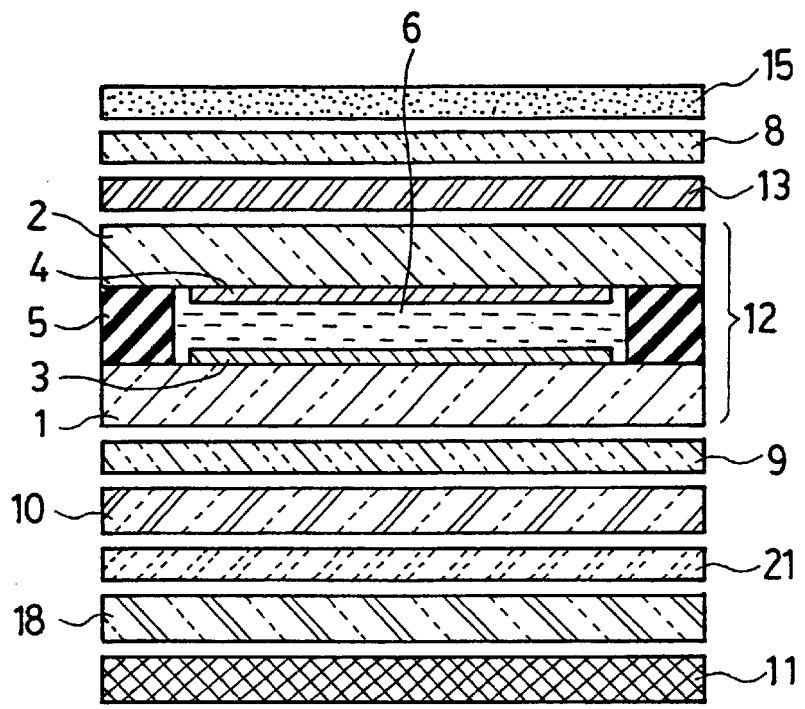
FIG. 14 is a schematic sectional view to illustrate the structure of a liquid crystal display device of a fourth embodiment according to the present invention.
Figure 15:
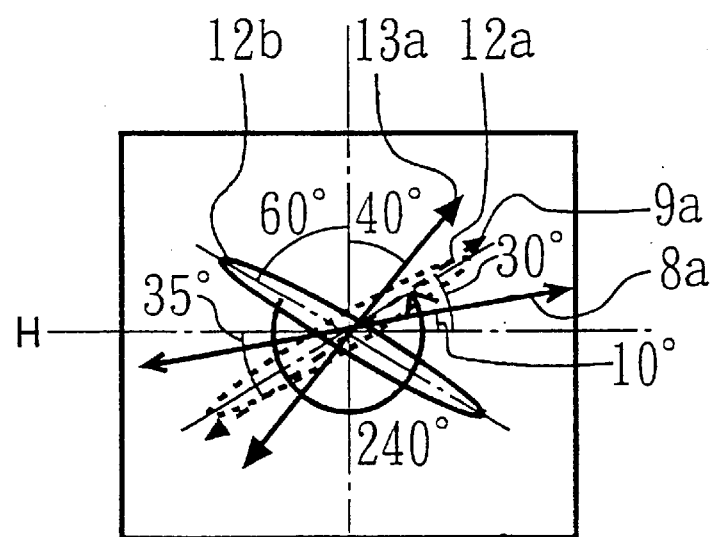
FIG. 15 is a plane view to illustrate the disposition relationship of the components thereof.
Figure 16:
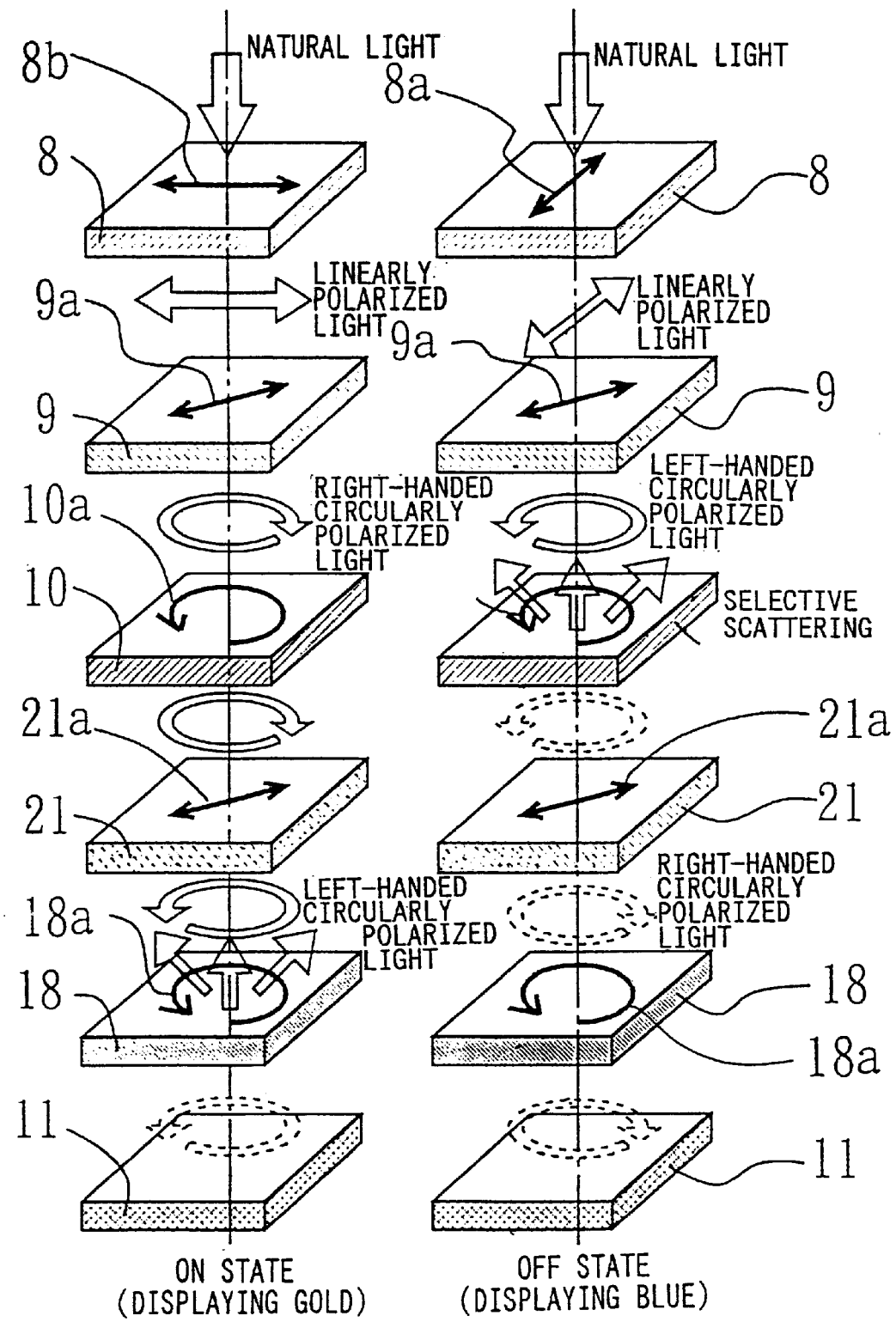
FIG. 16 is an explanatory view for a color display function of the liquid crystal display device.

Fourth Embodiment: FIG. 14 to FIG. 16

Next, a fourth embodiment of the liquid crystal display device according to the present invention will be described.

FIG. 14 is a schematic sectional view to illustrate the structure of the liquid crystal display device and FIG. 15 is a plane view to illustrate the disposition relationship of the components thereof. In FIG. 14 and FIG. 15, components identical to those in FIG. 1, FIG. 6 and FIG. 10 are designated by the same reference numerals and symbols, and detailed description thereof is omitted.

The liquid crystal display device in the fourth embodiment differs from that in the above-mentioned third embodiment in that an STN liquid crystal element similar to that in the first embodiment is used as a liquid crystal element, a retardation film is used, a light diffusing layer is formed using a light diffusion sheet, a half-wavelength retardation film 21 is used, and a second cholesteric liquid crystal polymer sheet having a left-handed twist is used. The remaining structure is the same as that in the third embodiment.

An STN liquid crystal element 12 of the liquid crystal display device in the fourth embodiment has entirely the same structure as that of the STN liquid crystal display element 12 in the first embodiment described with reference to FIG. 1.

A polarizing film 8 is disposed outside (upper side in FIG. 14) the STN liquid crystal element 12 such that the transmittable axis 8a shown in FIG. 15 is at an angle of +10 degrees with respect to the horizontal axis H serving as a reference. A retardation film 13 having a phase difference value of 550 nm is disposed between the STN liquid crystal element 12 and the polarizing film 8 such that the phase delay axis 13a shown in FIG. 15 is at an angle of +50 degrees with respect to the horizontal axis H.

A retardation film 9 for circularly polarized light is disposed outside (lower side in FIG. 14) the STN liquid crystal element 12 such that the phase delay axis 9a shown in FIG. 15 is at an angle of +35 degrees with respect to the horizontal axis H.

A first cholesteric liquid crystal polymer sheet 10 is disposed below the retardation film 9 for circularly polarized light. The half-wavelength retardation film 21, a second cholesteric liquid crystal polymer sheet 18, and black paper as a light absorbing film 11 are disposed below the first cholesteric liquid crystal polymer sheet 10.

The STN liquid crystal element 12, the retardation film 9 for circularly polarized light, the first cholesteric liquid crystal polymer sheet 10, the half-wavelength retardation film 21, and the second cholesteric liquid crystal polymer sheet 18 are bonded using an acrylic-based adhesive.

The polarizing film 8, the retardation film 13 and the STN liquid crystal element 12 are also bonded using an acrylic-based adhesive. A diffusing sheet 15 is disposed outside the polarizing film 8.

For the retardation film 13, a biaxial retardation film in which the relationship of nx>nz>ny is satisfied is utilized to improve the viewing angle characteristic, where nx represents a refractive index in the phase delay direction, ny represents a refractive index in the Y axis direction, and nz represents a refractive index in the thickness direction. However, a uniaxial retardation film can, of course, be utilized without causing any problem.

The first cholesteric liquid crystal polymer sheet 10 is the same as that used in the first embodiment and the twist direction thereof is left-handed.

The second cholesteric liquid crystal polymer sheet 18 has a pitch P=0.37 identical to that used in the third embodiment, while having a twist direction 18a of a left-handed twist which is opposite to that used in the third embodiment.

If the first cholesteric liquid crystal polymer sheet 10, the second cholesteric liquid crystal polymer sheet 18, the half-wavelength retardation film 21, the light absorbing film 11, and the diffusing sheet 15 were arranged at any angle, this would not affect the display characteristics so that the illustration thereof is omitted in the plane view of FIG. 15.

Next, the function for displaying colors in the liquid crystal display device of the fourth embodiment will be described with reference to FIG. 16 as well.

FIG. 16 is a perspective view to illustrate the coloring mechanism in the liquid crystal display device of the fourth embodiment.

In the liquid crystal display device, when no voltage is applied, i.e. in an off state, linearly polarized light in the direction of the transmittable axis 8a entering from the polarizing film 8 is changed into the state of elliptic polarized light after being transmitted through the STN liquid crystal element 12 in the absence of the phase plane 13. The elliptic polarized light cannot be changed into circularly polarized light even after being transmitted through the retardation film 9 for circularly polarized light, resulting in insufficient display.

However, the retardation film 13 is arranged between the polarizing film 8 and the STN liquid crystal element 12 so that linearly polarized light entering into the retardation film 13 from the polarizing film 8 is changed into a state of elliptic polarized light.

The elliptic polarized light is corrected during the transmission through the liquid crystal element 12, is rotated approximately 70 degrees with respect to the transmittable axis 8a of the polarizing film 8, and is emitted in a position at an angle of 80 degrees in an upper right direction in the form of substantially linearly polarized light.

The phase delay axis 9a of the retardation film 9 for circularly polarized light is disposed at an angle of +35 degrees with respect to the horizontal axis H. The linearly polarized light, therefore, enters into the retardation film 9 for circularly polarized light at an angle of 45 degrees counterclockwise with respect to the phase delay axis 9a to be changed into left-handed polarized light counterclockwise as shown in "off state" on the right side in FIG. 16.

Since a twist direction 10a of the first cholesteric liquid crystal polymer sheet 10 is left-handed, light having a wavelength in a scattering band width Δλ centering on a scattering center wavelength λc is reflected with selective scattering while light having a wavelength other than the scattering band width Δλ is transmitted. The transmitted light is, changed into right-handed circularly polarized light by means of the half-wavelength retardation film 21, is transmitted through the second cholesteric liquid crystal polymer sheet 18, and is absorbed by the light absorbing film 11 to thereby obtain a reflection color of a bright metallic blue.

Next, when a voltage is applied between a first electrode 3 and a second electrode 4, molecules of a nematic liquid crystal 6 rise to change the birefringence in the STN liquid crystal element 12. The linearly polarized light to be emitted is therefore rotated approximately 90 degrees and arranged at an angle of −10 degrees with respect to the horizontal axis H.

Thus, as shown in "on state" on the left side in FIG. 16, the linearly polarized light transmitted through the STN liquid crystal element 12 enters into the retardation film 9 for circularly polarized light at an angle of 45 degrees clockwise with respect to the phase delay axis 9a to be changed into right-handed circularly polarized light. This is opposite to the twist direction 10a in the first cholesteric liquid crystal polymer sheet 10 so that no selective scattering occurs to cause all of the incident right-handed circularly polarized light to be transmitted through the first cholesteric liquid crystal polymer sheet 10 and then changed into left-handed circularly polarized light by means of the half-wavelength retardation film 21.

Therefore, selective scattering occurs by the second cholesteric liquid crystal polymer sheet 18 having a twist direction 18a of a left-handed twist to absorb the transmitted light in the light absorbing film 11, obtaining a gold displaying color.

Also, since the STN liquid crystal element 12 is used as a liquid crystal element, deformation of the molecular alignment of the nematic liquid crystal 6 is more sensitive to an applied voltage, resulting in sharper optical characteristics.

Thus, an increased number of scanning lines ranging from 100 to 400 can be utilized even under simple matrix driving, making it possible to provide a large liquid crystal display device and a high-density liquid crystal display device.

Additionally, in the fourth embodiment, the light diffusing sheet 15 similar to that in the first embodiment is provided outside the polarizing film 8 to scatter mirror-like colors with the light diffusing sheet 15 so that mirror-like display appears in soft colors as viewed through frosted glass. The viewing angle characteristic is also improved to achieve better visibility for the liquid crystal display device.

In this way, the liquid crystal display device is constituted by the polarizing film 8, the retardation film 13, the STN liquid crystal element 12, the retardation film 9 for circularly polarized light, the first cholesteric liquid crystal polymer sheet 10, the half-wavelength retardation film 21, the second cholesteric liquid crystal polymer sheet 18, and the light absorbing film 11 to thereby obtain a liquid crystal display device which provides high density display with several hundreds of scanning lines, metallic color display on a bright color background, and multi-color display.

Modifications of the Fourth Embodiment

In the fourth embodiment, an STN liquid crystal element having a twist angle of 240 degrees is used as the STN liquid crystal element 12. However, similar effects can be obtained using any STN liquid crystal element as long as it has a twist angle ranging from 180 to 270 degrees.

Although the single retardation film is used to return the state of elliptic polarized light polarized by the STN liquid crystal element to linearly polarized light in the fourth embodiment, a plurality of retardation films can be used to return the elliptic polarized light to even more linearly polarized light, thus obtaining a more favorable color display.

In such a case, a plurality of retardation films can be disposed on one side of the STN liquid crystal element or on both sides thereof.

Additionally, in the fourth embodiment, the retardation film is used to return the state of elliptic polarized light polarized by the STN liquid crystal element to linearly polarized light. However, a twisted retardation film can be used instead of the retardation film to return the elliptic polarized light to more sufficiently linearly polarized light, thus obtaining a more favorable color display.

In this case, the twisted retardation film preferably has a twist angle equal to or smaller than the twist angle of the STN liquid crystal element by 10 to 30 degrees and has a twist direction opposite to that of the STN liquid crystal element When a twisted retardation film having a twist angle of 220 degrees clockwise and Δnd of 610 nm is disposed instead of the retardation film 13 in FIG. 14, a more favorable color display is obtained.

Figure 17:
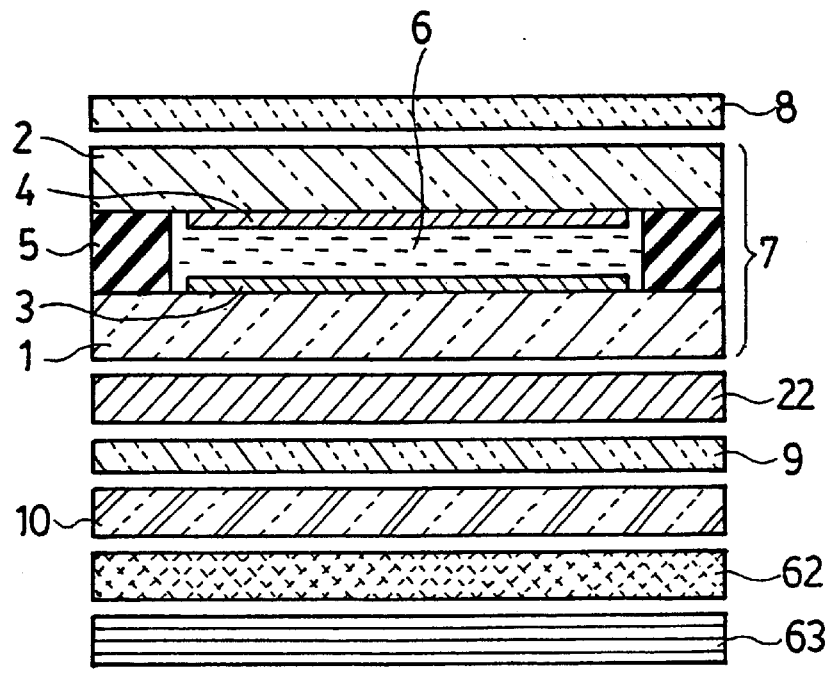
FIG. 17 is a schematic sectional view to illustrate the structure of a liquid crystal display. device of a fifth embodiment according to the present invention.
Figure 18:
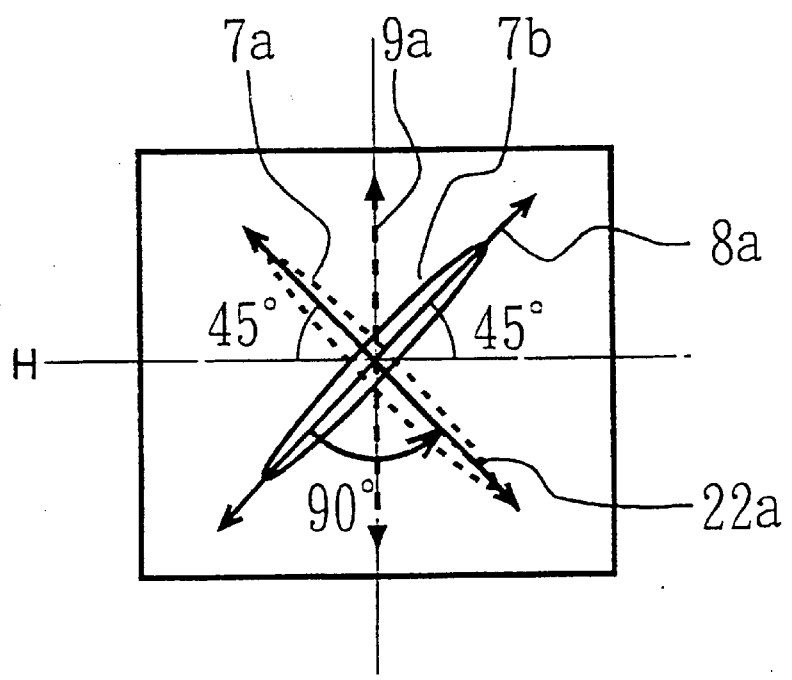
FIG. 18 is a plane view to illustrate the disposition relationship of the components thereof.
Figure 19:
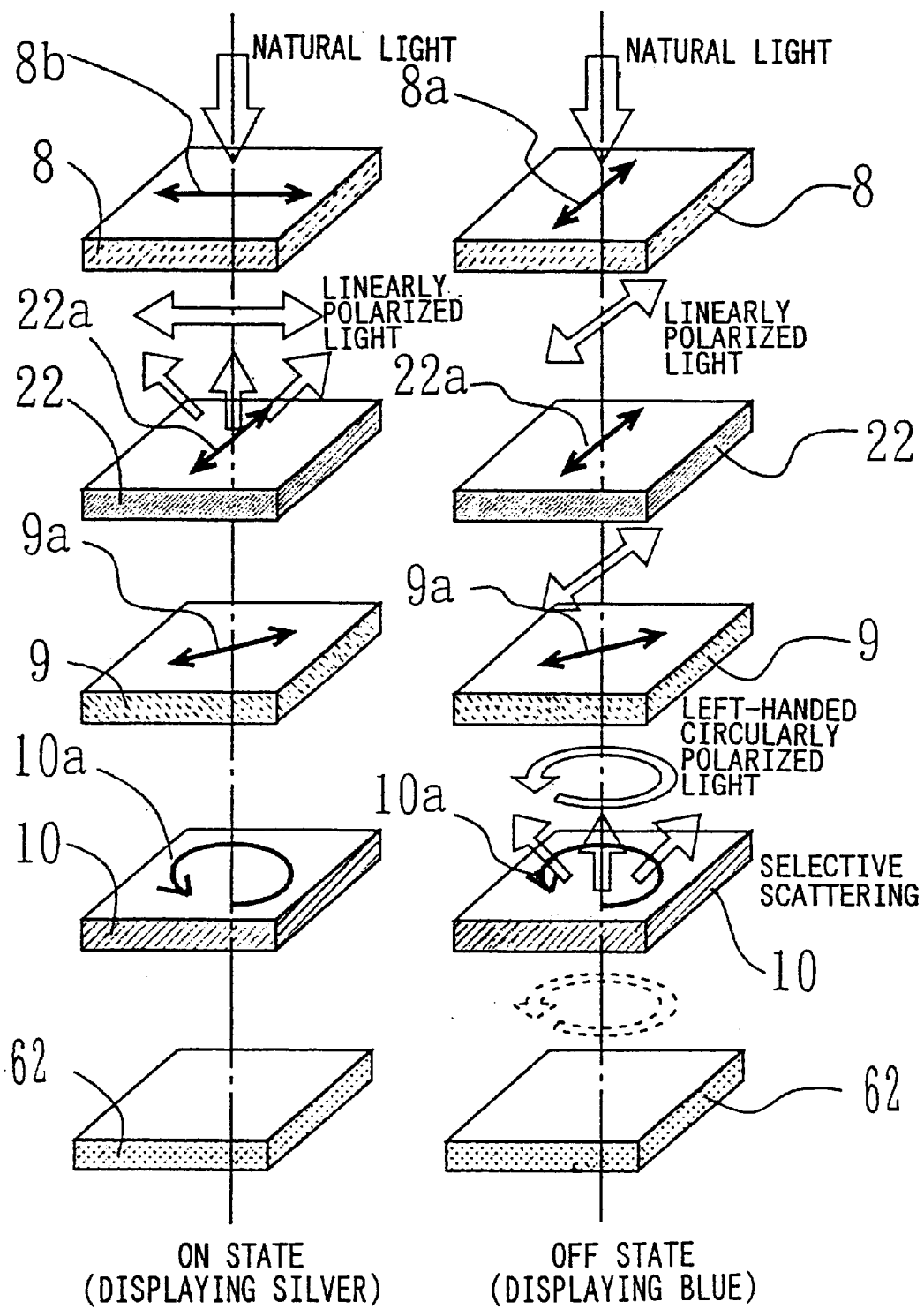
FIG. 19 is an explanatory view for a color display function of the liquid crystal display device.

Fifth Embodiment: FIG. 17 to FIG. 19

Next, a fifth embodiment of the liquid crystal display device according to the present invention will be described.

FIG. 17 is a schematic sectional view to illustrate the structure of the liquid crystal display device and FIG. 18 is a plane view to illustrate the disposition relationship of the component thereof. In FIG. 17 and FIG. 18, components identical to those in FIG. 1, FIG. 6, FIG. 10 and FIG. 14 are designated by the same reference numerals and symbols, and the detailed description thereof is omitted.

The liquid crystal display device in the fifth embodiment has the same structure as that in the fourth embodiment shown in FIG. 10 except that a reflection-type polarizing film 22 is used instead of the second cholesteric liquid crystal polymer sheet 18, a translucent light absorbing film 62 is used as a light absorbing film, and a backlight 63 for illumination is provided.

As shown in FIG. 17, a liquid crystal display element in the embodiment uses a TN liquid crystal element 7 identical to that in the third embodiment. A polarizing film 8 is disposed outside (upper side in FIG. 17) a second substrate 2 such that the transmittable axis 8a shown in FIG. 18 is at an angle of +45 degrees, which is the same as the upper molecular alignment direction 7b of the liquid crystal in the TN liquid crystal element 7.

The reflection-type polarizing film 22 is disposed outside (lower side in FIG. 17) a first substrate 1 of the TN liquid crystal element 7 at an angle of 45 degrees, which is the same as the lower molecular alignment direction 7a of the liquid crystal (FIG. 18) in the TN liquid crystal element. A retardation film 9 for circularly polarized light is disposed below the reflection-type polarizing film 22 such that the phase delay axis 9a is perpendicular as shown in FIG. 18.

A first cholesteric liquid crystal polymer sheet 10 having a twist direction 10a of a left-handed twist is disposed below the retardation film 9 for circularly polarized light.

The TN liquid crystal element 7, the reflection-type polarizing film 22, the retardation film 9 for circularly polarized light, and the first cholesteric liquid crystal polymer sheet 10 are bonded using an acrylic-based adhesive.

A black color polyethylene sheet is disposed as a translucent light absorbing film 62 below the first cholesteric liquid crystal polymer sheet 10.

The translucent light absorbing film 62 has a black color but has a transmittance ranging from 20 to 30%.

Additionally, the backlight 63 using an EL emitter is provided outside the translucent light absorbing film 62. By turning on the backlight 63, the liquid crystal display device can be utilized at night.

The polarizing film 8 is bonded to the TN liquid crystal element 7 using an acrylic-based adhesive.

The reflection-type polarizing film 22, unlike a typical absorption-type polarizing film, has a function of transmitting light in a direction of the transmittable axis 22a, but reflecting light in a direction deviated by 90 degrees from the transmissiottable axis 22a.

The reflection type polarizing film 22 has a structure in which thin films are laminated on a base film in a multilayer form. In this embodiment, the product named D-BEF, made by Sumitomo 3M Co., is employed.

The first cholesteric liquid crystal polymer sheet 10 is the same as that used in the first embodiment, and has a refractive index n=1.65 and a twist pitch P=0.37 $\mu$m with a left-handed twist.

Thus, a scattering center wavelength is derived as $\lambda c$=0.61 $\mu$m and the first cholesteric liquid crystal polymer sheet 10 exhibits a reflection color of a gold color.

Incidentally, if the first cholesteric liquid crystal polymer sheet 10, the translucent light absorbing film 62, and the backlight 63 were arranged at any angle, this would not affect the display characteristics so that the illustration thereof is omitted in the plane view of FIG. 18.

Next, the function for displaying colors in the liquid crystal display device of the fifth embodiment will be described with reference to FIG. 19 as well.

FIG. 19 is a perspective view to illustrate the coloring mechanism in the liquid crystal display device of the fifth embodiment.

In the liquid crystal display device, when no voltage is applied, i.e. in an off state, linearly polarized light in the direction of the transmittable axis 8a from the polarizing film 8 enters into the TN liquid crystal element 7 in the upper molecular alignment direction 7b of the liquid crystal in the TN liquid crystal element 7, is rotated 90 degrees by the TN liquid crystal element 7, and is emitted in the lower molecular alignment direction 7a of the liquid crystal.

Since the transmittable axis 22a of the reflection-type polarizing film 22 is disposed parallel to the lower molecular alignment direction 7a of the liquid crystal in the TN liquid crystal element 7, the linearly polarized light is transmitted through the reflection-type polarizing film 22 without any change.

The transmitted linearly polarized light enters into the retardation film 9 for circularly polarized light at an angle of 45 degrees counterclockwise to be changed into left-handed polarized light as shown in "off state" on the right side in FIG. 19.

This direction is the same as the twist direction 10a of the first cholesteric liquid crystal polymer sheet 10. Thus, light having a wavelength in a scattering band width $\Delta\lambda$ centering on a scattering center wavelength $\lambda c$=0.49 $\mu$m is reflected with selective scattering, while the light having a wavelength other than the scattering band width $\Delta\lambda$ is transmitted through the first cholesteric liquid crystal polymer sheet 10.

The transmitted light is absorbed by the translucent light absorbing film 62 so that a reflection color of a bright metallic blue can be obtained.

Next, when a voltage is applied between a first electrode 3 and a second electrode 4, molecules of a nematic liquid crystal 6 rise to lose their optical rotatory power. Linearly polarized light entering in the upper molecular alignment direction 7b of the liquid crystal passes through the TN liquid crystal element 7 with its polarization direction maintained.

Thus, the linearly polarized light transmitted through the TN liquid crystal element 7 enters into the reflection-type polarizing film 22 in a direction perpendicular to the transmittable axis 22a so that light in all wavelengths is reflected as shown in "on state" on the left side in FIG. 19 to provide metallic display in silver.

When the backlight 63 shown in FIG. 17 is turned on to see the display at night, the light of the backlight 63 is transmitted through the translucent light absorbing film 62 and is further transmitted through an area where no voltage is applied and a blue color is displayed.

The light of the backlight 63 is not transmitted through an area where a voltage is applied and metallic silver color display is provided. When an EL device for generating a whitish blue color is used as the backlight 63, the color liquid crystal display device displays blue color characters on a silver background in the daytime while the device displays a bright blue color on a dark background with the backlight 63 turned on at night, that is, the bright and dark color relationship is reversed.

In this way, the liquid crystal display device is constituted by the polarizing film 8, the TN liquid crystal element 7, the reflection type polarizing film 22, the retardation film 9 for circularly polarized light, the first cholesteric liquid crystal polymer sheet 10, the translucent light absorbing film 62, and the backlight 63 to thereby enable the metallic silver color display on a blue background.

Additionally, a color liquid crystal display device for multi-color display is obtained in which the dark and bright colors are displayed reverse to those displayed in a dark ambient light location by turning on the backlight in a dark place.

Modifications of the Fifth Embodiment

In the fifth embodiment, a single liquid crystal polymer sheet having a scattering center wavelength $\lambda c$=0.49 $\mu$m is used as the first cholesteric liquid crystal polymer sheet 10. However, two or more liquid crystal polymer sheets having the same twist direction and different scattering center wavelengths can be used one on the other to obtain optional colors. Thus, it is possible to obtain a color liquid crystal display device which provides silver color display on an optional background color.

When the transmittable axis 8a of the polarizing film 8 is rotated 90 degrees to be arranged in the same direction as the lower molecular alignment direction 7a of the liquid crystal, a silver color is displayed in a no-voltage state, i.e. in an off state, and a blue color is displayed in a voltage applied state, i.e. in an on state, on a silver color background.

Modifications from the First Embodiment to the Fifth Embodiment

In the second embodiment, the third embodiment and the fifth embodiment, the TN liquid crystal element 7 is used as a liquid crystal element. However, it is needless to say that an STN liquid crystal element as used in the first embodiment can be used in combination with a retardation film, or an STN liquid crystal element can be used in combination with a twisted retardation film.

In the first embodiment and the fourth embodiment, an STN liquid crystal element as a liquid crystal element and a retardation film are used. However, a TN liquid crystal element can be used as a liquid crystal element.

It is obvious that the light diffusing layer 14 provided on the polarizing film 8 used in the second embodiment and the third embodiment and the light diffusing sheet 15 used as the light diffusing layer in the first embodiment and the fourth embodiment are applied to the structure in any other embodiment.

Additionally, the use of a solar battery instead of the light absorbing film 1, which is described as a modification for the first embodiment and a modification for the third embodiment, can be applied to the structure in any other embodiment.

The translucent light absorbing film 62 and the backlight 63 used in the second embodiment and the fifth embodiment can also be applied to the structure in any other embodiment.

In particular, when the translucent light absorbing film 62 is removed and a color EL formed by color printing an EL plate is used as a backlight, the structure can be simplified and colors such as red or navy blue can be displayed.

Specifically, in the third embodiment, the fourth embodiment and the fifth embodiment, it is possible to increase the brightness when the backlight is turned on by removing the translucent light absorbing film 62 and directly providing a white backlight 63.

The increased brightness is obtained because the uneven surface of the backlight 63 causes polarized light scattering action by which the reflected light is absorbed by the cholesteric liquid crystal polymer sheet or the reflection-type polarizing film while being transmitted.

Sixth Embodiment: FIG. 20 to FIG. 23

Next, a sixth embodiment of the liquid crystal display device according to the present invention will be described with reference to FIG. 20 through FIG. 23. The sixth embodiment provides a multi-color liquid crystal display device in which a plurality of liquid crystal elements are stacked to enable display in three or more colors.

Figure 20:
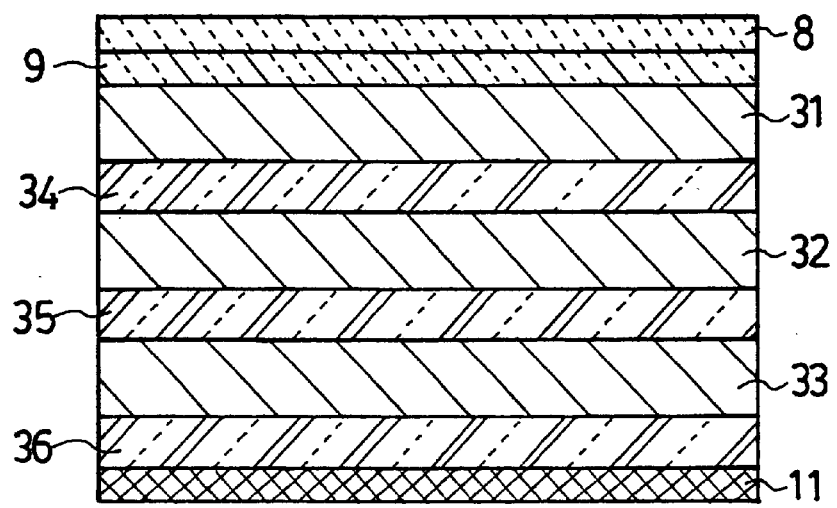
FIG. 20 is a schematic sectional view to illustrate the structure of a liquid crystal display device of a sixth embodiment according to the present invention.
Figure 21:
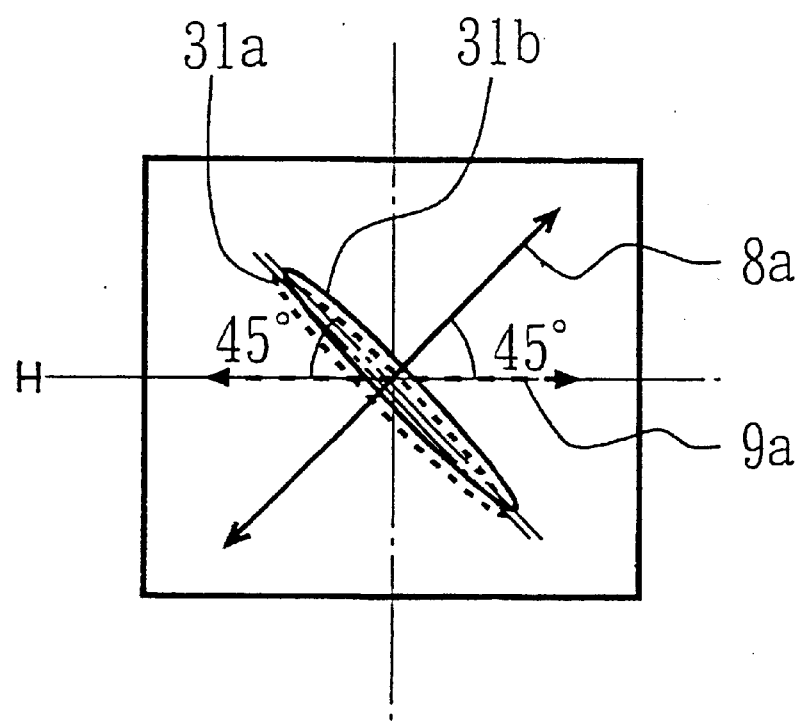
FIG. 21 is a plane view to illustrate the disposition relationship of the components thereof.

FIG. 20 is a schematic sectional view to illustrate the structure of the color liquid crystal display device in the sixth embodiment and FIG. 21 is a plane view to illustrate the disposition relationship of the components thereof.

The color liquid crystal display device in the embodiment has three parallel-aligned liquid crystal elements (PA. liquid crystal element) 31, 32, and 33.

Each of the PA liquid crystal elements 31, 32, and 33 is formed such that a first substrate, made of a glass sheet having a thickness of 0.7 mm on which a transparent first electrode composed of ITO is formed, and a second substrate, made of a glass sheet having a thickness of 0.7 mm on which a second transparent electrode also composed of ITO is formed, are bonded by a sealing material with a certain gap therebetween to sandwich a nematic liquid crystal 6 with zero-degree twist alignment between the pair of substrates.

Alignment layers are formed on respective surfaces of the first electrode and the second electrode in a first PA liquid crystal element 31. The first substrate is subject to rubbing treatment at an angle of 45 degrees in the lower right direction in FIG. 21 to provide a lower molecular alignment direction 31a of the liquid crystal at an angle of −45 degrees with respect to the horizontal axis H serving as a reference, and the second substrate is also subjected to rubbing treatment at an angle of 45 degrees in the lower right direction to provide an upper molecular alignment direction 31b of the liquid crystal also at an angle of −45 degrees with respect to the horizontal axis H, thereby forming the PA liquid crystal element 31 with zero-degree twist alignment.

A difference in birefringence Δn of the nematic liquid crystal 6 used is 0.1. A cell gap d which is the gap between the first substrate and the second substrate is set to be 2.8 μm.

Thus, a value of Δnd of the liquid crystal element, expressed by the product of the difference in birefringence Δn of the nematic liquid crystal and the cell gap d, is 280 nm. This value corresponds to approximately one half of the wavelength for green color, i.e. 550 nm, so that the rotating direction of light is reversed.

A second PA liquid crystal element 32 and a third PA liquid crystal element 33 have entirely the same structure as that of the first PA liquid crystal element 31 described above.

A retardation film 9 for circularly polarized light is disposed outside (upper side in FIG. 20) the first PA liquid crystal element 31, and a polarizing film 8 is disposed outside thereof.

The polarizing film 8 is disposed such that the transmittable axis 8a shown in FIG. 21 is at +45 degrees and the retardation film 9 for circularly polarized light is disposed such that the phase delay axis 9a is in the horizontal direction. The first PA liquid crystal element 31 is disposed below the retardation film 9 for circularly polarized light such that the upper molecular alignment direction 31b of the liquid crystal is at an angle of −45 degrees. A first cholesteric liquid crystal polymer sheet 34 is disposed below the first PA liquid crystal element 31.

The second PA liquid crystal element 32 and the second cholesteric liquid crystal polymer sheet 35 are disposed outside (lower side in FIG. 20) the first cholesteric liquid crystal polymer sheet 34. The third PA liquid crystal element 33 and the third cholesteric liquid crystal polymer sheet 36 are disposed thereunder. Disposed at the bottom, is a black plastic sheet as a light absorbing film 11.

The first PA liquid crystal element 31 and the first cholesteric liquid crystal polymer sheet 34 are bonded using an acrylic-based adhesive. The polarizing film 8, the retardation film 9 for circularly polarizing light, and the first PA liquid crystal element 31 are also bonded using an acrylic-based adhesive.

The second PA liquid crystal element 32, the second cholesteric liquid crystal polymer sheet 35, the third PA liquid crystal element 33, and the third cholesteric liquid crystal polymer sheet 36 are each also bonded using an acrylic-based adhesive.

The first cholesteric liquid crystal polymer sheet 34 is a sheet formed by performing aligning treatment on a base film made of a TAC film having a thickness of 80 μm, coating it with a cholesteric liquid crystal polymer having a left-handed twist, adjusting the liquid crystal to have a planar alignment parallel to the base film with a twist pitch P=0.30 μm at a high temperature which causes the liquid crystal phase, and then cooling it to a temperature below the transition temperature of the glass to be solidified.

Thus, the central axis of the twist is perpendicular to the base film and a scattering center wavelength is derived as λc=0.49 μm, exhibiting a blue color as a reflection color.

The second cholesteric liquid crystal polymer sheet 35 has a left-handed twist with a twist pitch P=0.32 μm and a scattering center wavelength λc=0.53 pun, exhibiting a green color. The third cholesteric liquid crystal polymer sheet 36 has a left-handed twist with a twist pitch P=0.37 μm and scattering center wavelength λc=0.62 μm, exhibiting a red color.

Incidentally, if the first, second, and third cholesteric liquid crystal polymer sheets 34, 35 and 36, and the light absorbing film 11 were arranged at any angle, this would not affect the display characteristics so that the illustration thereof is omitted in the plane view of FIG. 21.

Also, the second, third PA liquid crystal elements 32, 33 are disposed at the same angle as that for the first PA liquid crystal element 31 and if they were arranged at any angle, this would not affect the display characteristics so that the illustration thereof is omitted in the plane view of FIG. 21, excepting the first PA liquid crystal element 31.

Next, the function for displaying colors in the color liquid crystal display device of the sixth embodiment will be described with reference to FIG. 22 and FIG. 23 as well.

In the color liquid crystal display device, linearly polarized light in the direction of the transmittable axis 8a shown in FIG. 21, from the polarizing film 8 shown in 20, enters into the retardation film 9 for circularly polarized light at an angle of 45 degrees counterclockwise with respect to the phase delay axis 9a to be changed into left-handed circularly polarized light.

The first PA liquid crystal element 31 has a Δnd of 280 nm, which is approximately one half of the wavelength of the light. The state of the polarized light is therefore reversed in a no-voltage state, i.e. in an off state, to be changed into right-handed circularly polarized light.

Since the left-handed twist is employed as a twist direction of the first cholesteric liquid crystal polymer sheet 34, all the incident right-handed circularly polarized light is transmitted to the first cholesteric liquid crystal polymer sheet 34 and enters into the second PA liquid crystal element 32.

On the other hand, when a voltage is applied to the first PA liquid crystal element 31, molecules of the liquid crystal rise to cause the Δnd to change substantially to zero. The state of the polarized light is not changed and remains in the incident light state of the left-handed circularly light.

Thus, selective scattering occurs by the first cholesteric liquid crystal polymer sheet 34 to reflect light in a wavelength range for a blue color. On the other hand, light in a wavelength range other than for a blue color is transmitted and enters into the second PA liquid crystal element 32.

The second PA liquid crystal element 32 and the second cholesteric liquid crystal polymer sheet 35 cause similar actions. Specifically, the light in a wavelength range for a green color is reflected or all the incident light is transmitted. The third PA liquid crystal element 33 and the third cholesteric liquid crystal polymer sheet 36 also cause similar actions. Specifically, the light in a wavelength range for a red color is reflected or all the incident light is transmitted. The light transmitted through the third cholesteric liquid crystal polymer sheet 36 is absorbed by the light absorbing film 11.

Figure 22:
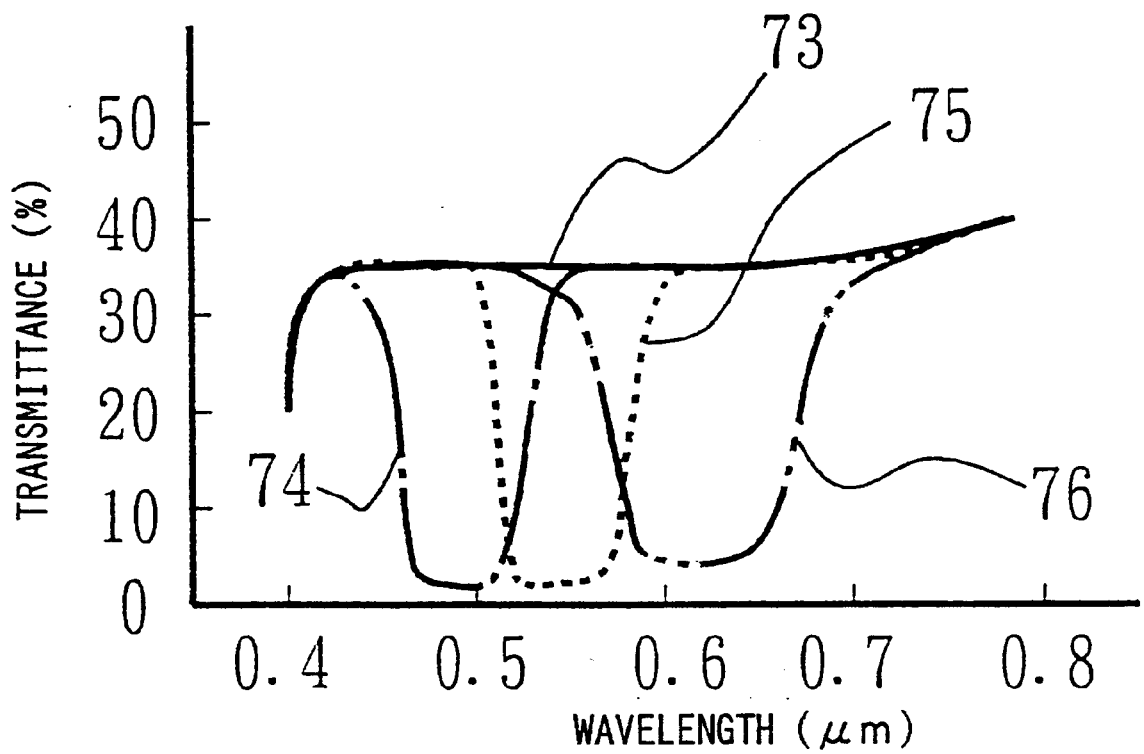
FIG. 22 is a diagram showing a relationship between the wavelength of incident light and the transmittance in the liquid crystal display device of the sixth embodiment according to the present invention.

FIG. 22 is a diagram representing a relationship between the wavelength of incident light and the transmittance in the color liquid crystal display device of the embodiment. A solid line curve 73 represents the transmittance in a black color displaying state, a one-dot chain line curve 74 represents the transmittance in a blue color displaying state, a broken line curve 75 represents the transmittance in a green color displaying state, and a two-dot chain line curve 76 represents the transmittance in a red color displaying state, respectively.

In the red color displaying state, as shown in the curve 76, right-handed circularly polarized light ranging from 0.56 μm to 0.67 μm centering on the scattering center wavelength λc=0.61 μm is reflected, while light having a wavelength other than the scattering band width is transmitted without being reflected.

Also, in the blue color displaying state and the green color displaying state, as shown by the curves 74, 75 respectively, light in a scattering band width Δλ centering on the scattering wavelength λc is reflected, while light in a wavelength range other than the scattering band width is transmitted.

In the black color displaying state, as shown in the curve 73, an amount of light of approximately 35% is transmitted through the third cholesteric liquid crystal polymer sheet 36 to be absorbed by the light absorbing film 11.

FIG. 23 shows a relationship between the on/off states of respective PA liquid crystal elements and the displayed colors in the color liquid crystal display device of the sixth embodiment A combination of on/off states of respective PA liquid crystal elements 31, 32, and 33 enables display in eight colors, i.e. green, yellow, red, black (transmitted), violet, blue, sky blue, and white.

In this way, the color liquid crystal display device is constituted by the single polarizing film 8, the retardation film 9 for circularly polarized light, three PA liquid crystal elements, three cholesteric liquid crystal polymer sheets and the light absorbing film 11 to thereby obtain a liquid crystal display device for multi-color display which enables display in eight bright colors.

Figure 24:
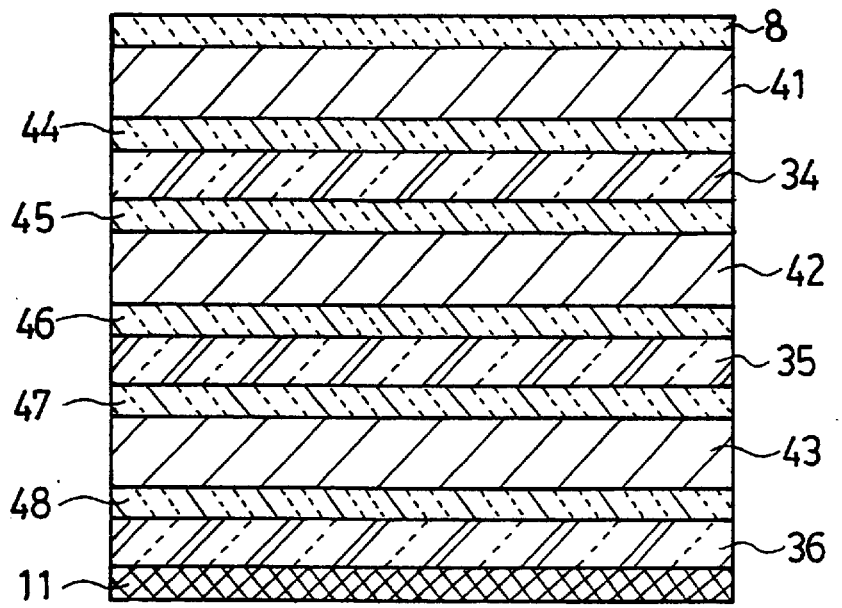
FIG. 24 is a schematic sectional view to illustrate the structure of a liquid crystal display device of a seventh embodiment according to the present invention.
Figure 25:
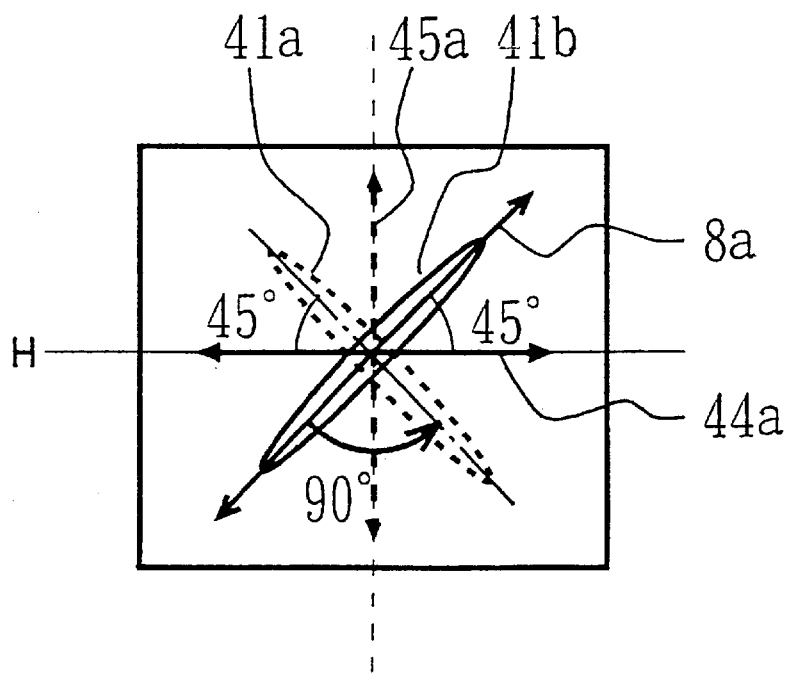
FIG. 25 is a plane view to illustrate the disposition relationship of the components thereof.

Seventh Embodiment: FIG. 24, FIG. 25

Next, a color liquid crystal display device of a seventh embodiment in the present invention will be described with reference to FIG. 24 and FIG. 25.

In the above-mentioned sixth embodiment, the PA liquid crystal element with zero degree twist alignment and Δnd= 280 nm is used as a liquid crystal element. However, similar display can be obtained with a typical TN liquid crystal element. The seventh embodiment uses a TN liquid crystal element to realize a multi-color liquid crystal display device for displaying eight colors.

FIG. 24 is a schematic sectional view to illustrate the structure of the color liquid crystal display device in the seventh embodiment and FIG. 25 is a plane view to illustrate the disposition relationship of the component thereof. In FIG. 24 and FIG. 25, components identical to those in FIG. 20 and FIG. 21 are designated by the same reference numerals and symbols.

The color liquid crystal display device in the seventh embodiment has three TN alignment liquid crystal elements 41, 42 and 43. Each of the TN liquid crystal elements 41, 42 and 43 is formed such that a first substrate, made of a glass sheet having a thickness of 0.7 mm on which a first electrode composed of ITO is formed, and a second substrate, made of a glass sheet having a thickness of 0.7 mm on which a second electrode composed of ITO is formed, are bonded by a sealing material with a certain gap therebetween to sandwich a nematic liquid crystal 6 twist-aligned at a twist angle of 90 degrees between the pair of substrates.

In a first TN liquid crystal element 41, alignment layers are formed on respective surfaces of the first electrode and the second electrode, and the first substrate is subjected to rubbing treatment at an angle of 45 degrees in the lower right direction in FIG. 25 to provide a lower molecular alignment direction 41a of the liquid crystal at an angle of −45 degrees with respect to the horizontal axis H serving as a reference, while the second substrate is subjected to rubbing treatment at an angle of 45 degrees in the upper right direction to provide an upper molecular alignment direction 41b of the liquid crystal at an angle of +45 degrees with respect to the horizontal axis H, thereby forming the TN liquid crystal element 41 having a twist alignment at a twist angle of 90 degrees.

A difference in birefringence $\Delta n$ of the nematic liquid crystal 6. used is 0.15. A cell gap d which is a gap between the first substrate and the second substrate is set to be 8 $\mu$m.

Thus, the value of $\Delta nd$ of the liquid crystal element, expressed by the product of the difference in birefringence $\Delta n$ of the nematic liquid crystal and the cell gap d, is 1200 nm.

A second TN liquid crystal element 42 and a third TN liquid crystal element 43 have entirely the same structure as that of the first TN liquid crystal element 41.

A polarizing film 8 is disposed outside (upper side in FIG. 24) the first TN liquid crystal element 41 such that the transmittable axis 8a of the polarizing film 8 shown in FIG. 25 is at an angle of 45 degrees in the upper right direction, which is parallel to the upper molecular alignment direction 41b of the liquid crystal of the first TN liquid crystal element 41.

A first retardation film 44 for circularly polarized light is disposed below the first TN liquid crystal element 41 such that the phase delay axis 44a shown in FIG. 25 is in the horizontal direction. A first cholesteric liquid crystal polymer sheet 34 is disposed below the first retardation film 44 for circularly polarized light.

Also, a second retardation film 45 for circularly polarized light is disposed below the first cholesteric liquid crystal polymer sheet 34 such that the phase delay axis 45a thereof is rotated 90 degrees perpendicularly with respect to the phase delay axis 44a of the first retardation film 44 for circularly polarized light.

Similarly, a third retardation film 46 for circularly polarized light is disposed such that the phase delay axis thereof is in a horizontal direction with respect to the second TN liquid crystal element 42. A fourth retardation film 47 for circularly polarized light is disposed such that a phase delay axis thereof is perpendicular through a second cholesteric liquid crystal polymer sheet 35. A fifth retardation film 48 for circularly polarized light is disposed such that the phase delay axis thereof is in the horizontal direction with respect to the third TN liquid crystal element 43. A third cholesteric liquid crystal polymer sheet 36 is disposed below the fifth retardation film 48 for circularly polarized light. A black color plastic sheet is disposed as a light absorbing film 11 at the bottom.

The first TN liquid crystal element 41, the first retardation film 44 for circularly polarized light, the first cholesteric liquid crystal polymer sheet 34, and the second retardation film 45 for circularly polarized light are bonded using an acrylic-based adhesive.

The polarizing film 8 and the first TN liquid crystal element 41 are also bonded using an acrylic-based adhesive. The second TN liquid crystal element 42, the third retardation film 46 for circularly polarized light, the second cholesteric liquid crystal polymer sheet 35, the fourth retardation film 47 for circularly polarized light, the third TN liquid crystal element 43, the fifth retardation film 48 for circularly polarized light, and the third cholesteric liquid crystal polymer sheet 36 are also bonded using an acrylic-based adhesive.

The first cholesteric liquid crystal polymer sheet 34 is a sheet formed by performing aligning treatment on a base film made of a TAC film having a thickness of 80 $\mu$m, coating it with a cholesteric liquid crystal polymer having a left-handed twist, adjusting the liquid crystal to have a planar alignment parallel to the base film with a twist pitch P=0.30 $\mu$m at a high temperature which causes a liquid crystal phase, and then cooling it to a temperature below the transition temperature of the glass to be solidified.

Thus, the central axis of the twist is perpendicular to the base film and a scattering center wavelength is derives as $\lambda c$=0.49 $\mu$m, exhibiting a blue color as a reflection color.

The second cholesteric liquid crystal polymer sheet 35 has a left-handed twist with a twist pitch P=0.32 $\mu$m and a scattering center wavelength $\lambda c$=0.53 $\mu$m, exhibiting a green color. The third cholesteric liquid crystal polymer sheet 36 has a left-handed twist with a twist pitch P=0.37 $\mu$m and a scattering center wavelength $\lambda c$=0.62 $\mu$m, exhibiting a red color.

Incidentally, if the first, second, and third cholesteric liquid crystal polymer sheets 34, 35, and 36 and the light absorbing film 11 were arranged at any angle, this would not affect the display characteristics so that the illustration thereof is omitted in the plane view of FIG. 25.

Also, since the first, second, and third TN liquid crystal element 41, 42, and 43 are all disposed in the same way, the illustration thereof is omitted in the plane view of FIG. 25 excepting the first TN liquid crystal element 41.

The first retardation film 44 for circularly polarized light, the third retardation film 46 for circularly polarized light, and the fifth retardation film 48 for circularly polarized light are disposed at the same angle. Also, the second retardation film 45 for circularly polarized light and the fourth retardation film 47 for circularly polarized light are disposed at the same angle. Thus, the illustration is omitted in the plane view of FIG. 25, except the phase delay axis 44a of the first retardation film 44 for circularly polarized light and the phase delay axis 45a of the second retardation film 45 for circularly polarized light are shown.

Next, the function for displaying colors in the color liquid crystal display device of the seventh embodiment will be described.

In the color liquid crystal display device, linearly polarized light in the direction of the transmittable axis 8a shown in FIG. 25 from the outside of the polarizing film 8 shown in FIG. 24 enters into the first TN liquid crystal element 41 in the upper molecular alignment direction 41b of the liquid crystal. When no voltage is applied, i.e. in an off state, the light is rotated 90 degrees to be emitted in the lower molecular alignment direction 41a of the liquid crystal. The light enters into the first retardation film 44 for circularly polarized light at an angle of 45 degrees clockwise with respect to the phase delay axis 44a shown in FIG. 25 to be changed into right-handed circularly polarized light.

Since a left-handed twist is employed as a twist direction of the first cholesteric liquid crystal polymer sheet 34, all the incident right-handed circularly polarized light is transmitted through the first cholesteric liquid crystal polymer sheet 34, entering into the second retardation film 45 for circularly polarized light, and is returned into linearly polarized light parallel to the lower molecular alignment direction 41*a* of the liquid crystal.

On the other hand, when a voltage is applied to the first TN liquid crystal element 41, molecules of the liquid crystal rise to lose their optical rotatory power. The linearly polarized light entering from the polarizing film 8 into the first TN liquid crystal element 41 is emitted parallel to the upper molecular alignment direction 41*b* of the liquid crystal. The light is entered into the first retardation film 44 for circularly polarized light at an angle of 45 degrees counterclockwise with respect to the phase delay axis 44*a* to be changed into left-handed circularly polarized light.

Thus, selective scattering occurs by means of the first cholesteric liquid crystal polymer sheet 34. Light in a wavelength range for a blue color is reflected, while light in a wavelength range other than for a blue color is transmitted and entered into the second retardation film 45 for circularly polarized light to be returned into linearly polarized light parallel to the upper molecular alignment direction 41*b* of the liquid crystal.

The second TN liquid crystal element 42, the third retardation film 46 for circularly polarized light, the second cholesteric liquid crystal polymer sheet 35, and the fourth retardation film 47 for circularly polarized light cause similar actions. Specifically, light in a wavelength range for a green color is reflected or all the incident light is transmitted.

The third TN -liquid crystal element 43, the fifth retardation film 48 for circularly polarized light, and the third cholesteric liquid crystal polymer sheet 36 also cause similar actions. Specifically, light in a wavelength range for a red color is reflected or all the incident light is transmitted. The light transmitted through the third cholesteric liquid crystal polymer sheet 36 is absorbed by the light absorbing film 11.

Therefore, the color liquid crystal display device in the seventh embodiment enables display in eight colors, i.e. green, yellow, red, black (transmitted), violet, blue, sky blue, and white, similarly to the color liquid crystal display device in the sixth embodiment.

In this way, the liquid crystal display device is constituted by the single polarizing film 8, five retardation films for circularly polarized light, three TN liquid crystal elements, three cholesteric liquid crystal polymer sheets and the light absorbing film 11 to thereby obtain a liquid crystal display device for multi-color display which enables display in eight bright colors.

Modifications of the Seventh Embodiment

In the seventh embodiment, three TN liquid crystal elements are used as a liquid crystal display element However, an STN liquid crystal element in a retardation film scheme or an STN 1 liquid crystal element in a twisted retardation film scheme can be used. Also, a combination of these liquid crystal elements and a PA liquid crystal element can be used.

Although the phase delay axis 44*a* of the first retardation film 44 for circularly polarized light and the phase delay axis 45*a* of the second retardation film 45 for circularly polarized light are disposed at right angles in the seventh embodiment, they can be disposed parallel to each other. In such a case, linearly polarized light emitted from the second retardation film 45 for circularly polarized light is rotated 90 degrees so that it is required to change the on/off control for the TN liquid crystal element.

Effect of the Invention

The liquid crystal display device according to the present invention can be constituted by a single polarizing film, a retardation film, an STN liquid crystal element, a cholesteric liquid crystal polymer sheet, a retardation film for circularly polarized light and a light absorbing film to thereby enable a good viewing angle characteristic and high-density display as well as single-color display with a high contrast in which bright metallic colors and a black color are displayed.

Also, by using a translucent light absorbing film as a light absorbing film and having a backlight, a liquid crystal display device with favorable visibility at night can be provided.

Additionally, two cholesteric liquid crystal polymer sheets having different twist directions are used or two cholesteric liquid crystal polymer sheets having the same twist direction and a half-wavelength retardation film are used, making it possible to provide a liquid crystal display device which can perform multi-color display with brightly colored characters or figures on a colored background.

Furthermore, three liquid crystal elements and three cholesteric liquid crystal polymer sheets are used so that a multi-color liquid crystal display device which enables display in eight colors can be provided

What is claimed is:

1. A liquid crystal display device comprising:
   a TN liquid crystal element arranged to sandwich a nematic liquid crystal twist-aligned at a twist angle of approximately 90 degrees between a first substrate having a first electrode and a second substrate having a second electrode;
   a polarizing film provided outside said second substrate;
   a retardation film for circularly polarized light provided outside of said first substrate;
   a first cholesteric liquid crystal polymer sheet provided outside said retardation film for circularly polarized light;
   a second cholesteric liquid crystal polymer sheet provided outside said first cholesteric liquid crystal polymer sheet; and
   a light absorbing film provided outside said second cholesteric liquid crystal polymer sheet, wherein
   said first cholesteric liquid crystal polymer sheet and said second cholesteric liquid crystal polymer sheet have scattering center wavelengths different from each other and have twist directions in opposite directions.

2. A liquid crystal display device comprising:
   a TN liquid crystal element arranged to sandwich a nematic liquid crystal twist-aligned at an angle of approximately 90 degrees between a first substrate having a first electrode and a second substrate having a second electrode;
   a polarizing film provided outside said second substrate;
   a retardation film for circularly polarized light provided outside said first substrate;
   a first cholesteric liquid crystal polymer sheet provided outside said retardation film for circularly polarized light;
   a half-wavelength retardation film provided outside said first cholesteric liquid crystal polymer sheet;
   a second cholesteric liquid crystal polymer sheet provided outside said half-wavelength retardation film; and a light absorbing film provided outside said second cholesteric liquid crystal polymer sheet, wherein said first cholesteric liquid crystal polymer sheet and said second cholesteric liquid crystal polymer sheet have scattering center wavelengths different from each other and have respective twist directions in the same direction.

3. A liquid crystal display device comprising:

a TN liquid crystal element arranged to sandwich a nematic liquid crystal twist-aligned at an angle of approximately 90 degrees between a first substrate having a first electrode and a second substrate having a second electrode;

a polarizing film provided outside said second substrate;

a reflection-type polarizing film provided outside said first substrate;

a retardation film for circularly polarized light provided outside said reflection-type polarizing film;

a cholesteric liquid crystal polymer sheet provided outside said retardation film for circularly polarized light; and a light absorbing film provided outside said cholesteric liquid crystal polymer sheet.

4. A liquid crystal display device comprising:

a TN liquid crystal element arranged to sandwich a nematic liquid crystal twist-aligned at an angle of approximately 90 degrees between a first substrate having a first electrode and a second substrate having a second electrode;

a polarizing film provided outside said second substrate;

a light diffusing layer provided on an outer surface of said polarizing film;

a retardation film for circularly polarized light provided outside of said first substrate;

a cholesteric liquid crystal polymer sheet provided outside said retardation film for circularly polarized light; and a light absorbing film provided outside said cholesteric liquid crystal polymer sheet.

5. The liquid crystal display device according to claim 4, wherein said light diffusing layer is a light diffusing sheet.

6. The liquid crystal display device according to claim 1, further comprising a light diffusing layer provided on an outer surface of said polarizing film.

7. The liquid crystal display device according to claim 3, further comprising a light diffusing layer provided on an outer surface of said polarizing film.

8. The liquid crystal display device according to claim 1, wherein said light absorbing film is a solar battery.

9. The liquid crystal display device according to claim 3, wherein said light absorbing film is a solar battery.

10. The liquid crystal display device according to claim 1, wherein said light absorbing film is a translucent light absorbing film and a backlight is provided outside said translucent light absorbing film.

11. The liquid crystal display device according to claim 3, wherein said light absorbing film is a translucent light absorbing film and a backlight is provided outside said translucent light absorbing film.

* * * * *